United States Patent
Chung et al.

(10) Patent No.: US 9,385,801 B2
(45) Date of Patent: *Jul. 5, 2016

(54) METHOD AND APPARATUS FOR TRANSMITTING CONTROL INFORMATION FROM RELAY NODE ON BACKHAUL UPLINK

(71) Applicant: LG Electronics Inc., Seoul (KR)

(72) Inventors: Jae Hoon Chung, Gyeonggi-do (KR); Moon Il Lee, Gyeonggi-do (KR); Kyu Jin Park, Gyeonggi-do (KR); Sung Ho Moon, Gyeonggi-do (KR); Seung Hee Han, Gyeonggi-do (KR); Yeong Hyeon Kwon, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/851,512

(22) Filed: Sep. 11, 2015

(65) Prior Publication Data

US 2016/0006498 A1 Jan. 7, 2016

Related U.S. Application Data

(63) Continuation of application No. 14/298,449, filed on Jun. 6, 2014, now Pat. No. 9,160,514, which is a
(Continued)

(51) Int. Cl.
*H04L 5/00* (2006.01)
*H04B 7/14* (2006.01)
(Continued)

(52) U.S. Cl.
CPC .................. *H04B 7/14* (2013.01); *H04B 7/155* (2013.01); *H04B 7/15542* (2013.01); *H04L 1/1671* (2013.01); *H04L 1/1812* (2013.01); *H04L 1/1861* (2013.01); *H04L 5/0092* (2013.01); *H04L 27/2605* (2013.01);
(Continued)

(58) Field of Classification Search
None
See application file for complete search history.

(56) References Cited

U.S. PATENT DOCUMENTS 8,098,623 B2 * 1/2012 Ramesh ................ H04L 1/0083
370/329
2006/0270341 A1 11/2006 Kim et al. ........................ 455/16
(Continued)

OTHER PUBLICATIONS

Motorola: "Optimization of Resource Assignment for Uplink Backhaul", 3GPP RAN1 #57, San Francisco, California, May 4-8, 2009, R1-092169.
(Continued)

*Primary Examiner* — Chirag Shah
*Assistant Examiner* — Rina Pancholi
(74) *Attorney, Agent, or Firm* — Dentons US LLP

(57) ABSTRACT

According to one embodiment of the present invention, the method for transmitting control information from a relay node to a base station on a backhaul link comprises the steps of: determining whether one time slot of a backhaul uplink subframe from the relay node to the base station is a first type slot having transmitted symbol with guard time set or a second type slot without guard time set; diffusing the control information in a time domain using a first length sequence for the first type slot or a second length sequence for the second type slot; mapping the diffused control information on at least one slot from the first type slot or the second type slot; and transmitting the backhaul uplink subframe having more than one slot from the first type slot or the second type slot wherein the control information is mapped.

10 Claims, 18 Drawing Sheets

Related U.S. Application Data continuation of application No. 13/322,884, filed as application No. PCT/KR2010/003474 on May 31, 2010, now Pat. No. 8,780,784.

(60) Provisional application No. 61/185,964, filed on Jun. 10, 2009, provisional application No. 61/262,127, filed on Nov. 17, 2009, provisional application No. 61/182,112, filed on May 29, 2009.

(51) Int. Cl.

| | |
|---|---|
| *H04L 1/16* | (2006.01) |
| *H04L 1/18* | (2006.01) |
| *H04L 27/26* | (2006.01) |
| *H04B 7/155* | (2006.01) |
| *H04W 16/26* | (2009.01) |
| *H04W 72/04* | (2009.01) |
| *H04W 76/04* | (2009.01) |
| *H04L 1/00* | (2006.01) |
| *H04W 84/04* | (2009.01) |
| *H04W 88/08* | (2009.01) |
| *H04W 92/04* | (2009.01) |
| *H04W 88/02* | (2009.01) |

(52) U.S. Cl.
CPC .......... *H04L 27/2613* (2013.01); *H04W 16/26* (2013.01); *H04W 72/042* (2013.01); *H04W 72/0406* (2013.01); *H04W 72/0446* (2013.01); *H04W 76/046* (2013.01); *H04L 1/0031* (2013.01); *H04L 5/001* (2013.01); *H04L 5/0048* (2013.01); *H04L 5/0055* (2013.01); *H04L 2001/0097* (2013.01); *H04W 84/047* (2013.01); *H04W 88/02* (2013.01); *H04W 88/08* (2013.01); *H04W 92/04* (2013.01)

(56) References Cited

U.S. PATENT DOCUMENTS

| | | | |
|---|---|---|---|
| 2008/0013520 A1 | 1/2008 | Liu et al. ................ | 370/347 |
| 2008/0070582 A1 | 3/2008 | Cai | |
| 2008/0160912 A1 | 7/2008 | Kim et al. | |
| 2010/0080166 A1* | 4/2010 | Palanki ............. | H04B 7/2606 370/315 |
| 2010/0159935 A1 | 6/2010 | Cai et al. ................ | 455/450 |
| 2010/0195586 A1 | 8/2010 | Choi et al. ............. | 370/329 |
| 2010/0202559 A1 | 8/2010 | Luo et al. ............... | 375/295 |
| 2010/0210256 A1 | 8/2010 | Shen et al. | |
| 2010/0281323 A1 | 11/2010 | Wang et al. ............. | 714/748 |

OTHER PUBLICATIONS

Huawei: "Relay from structure design for TDD mode", 3GPP TSG RAN WG1 Meeting #56 bis, Seoul, Korea, Mar. 23-27, 2009, R1-091270.

* cited by examiner

FIG. 7

$n_{PRB} = N_{RB}^{UL} - 1$

| CQI | CQI |
|---|---|
| CQI+A/N | A/N |
| | A/N |
| | |
| DATA ||
| | |

$n_{PRB} = 0$

| | |
|---|---|
| DATA ||
| | |
| A/N | |
| A/N | CQI+A/N |
| CQI | CQI |

One subframe

B : Backhaul UL transmission
A : Access UL reception

B : Backhaul UL transmission

A : Access UL reception

METHOD AND APPARATUS FOR TRANSMITTING CONTROL INFORMATION FROM RELAY NODE ON BACKHAUL UPLINK

This Application is a Continuation of Ser. No. 14/298,449 filed Jun. 6, 2014, which is a continuation of U.S. application Ser. No. 13/322,884 filed Nov. 28, 2011 (now issued as U.S. Pat. No. 8,780,784), which is a 35 U.S.C. §371 National Stage Entry of International Application No.: PCT/KR2010/003474, filed on May 31, 2010, which claims the benefit of priority to U.S. Provisional Application Nos. 61/182,112, filed May 29, 2009, 61/185,964, filed Jun. 10, 2009 and 61/262,127, filed Nov. 17, 2009, all of which are hereby incorporated by reference in their entirety for all purposes as if fully set forth herein.

TECHNICAL FIELD

The present invention relates to a wireless communication system, and more particularly, to a method and apparatus for transmitting control information in a relay node backhaul uplink.

BACKGROUND ART

FIG. 1 shows a relay node (RN) 120, a user equipment (UE) 131 and a user equipment (UE) 132 within an area of a base station (eNodeB: eNB) 110 in a wireless communication system 100. The relay node 120 may deliver data received from the base station 110 to the user equipment 132 within a relay node area and may deliver data received from the user equipment 132 within the relay node area to the base station 110. The relay node 120 may extend a fast data rate area, raise communication quality on a cell edge, and support a communication to be provided to an inside of a building or an area out of a base station service area. Referring to FIG. 1, such a user equipment (hereinafter named Macro-UE) directly receiving a service from the base station as a user equipment 131 and such a user equipment (hereinafter named Relay-UE) receiving a service from the relay node 120 as a user equipment 132 may coexist.

FIG. 2 shows links among a base station, a relay node and a user equipment. The relay node may be connected with the base station via an interface Un by wireless. And, a radio link between the base station and the relay node is called a backhaul link. And, a link from the base station to the relay node is called a backhaul downlink. Moreover, a link from the relay node to the base station is called a backhaul uplink. The relay node may be connected to a user equipment via an interface Uu by wireless and a radio link between the relay node and the user equipment is called an access link. A link from the relay node to the user equipment is called an access downlink and a link from the user equipment to the relay node is called an access uplink. If a backhaul link operates on a same frequency band of an access link, it can be called 'in-band'. If a backhaul link and an access link operate on different frequency bands, respectively, it can be called 'out-band'.

Via a backhaul link from a relay node to a base station, it may be necessary to transmit such physical layer control information as scheduling request (SR), downlink channel measurement information, acknowledgement/negative-acknowledgement (ACK/NACK) for downlink data transmission and the like. Yet, a method of transmitting the above-mentioned backhaul uplink physical layer control information has not been determined in detail.

DISCLOSURE OF THE INVENTION

Technical Task

The technical task of the present invention is to provide a method of transmitting control informations to a base station from a relay node via a backhaul uplink.

Technical Solution

To achieve these and other advantages and in accordance with the purpose of the present invention, as embodied and broadly described, a method of transmitting backhaul uplink control information, which is transmitted from a relay node to a base station, according to one embodiment of the present invention may include the steps of determining whether one time slot of a backhaul uplink subframe from the relay node to the base station is a 1st type slot including a transmission symbol having a guard time set therefor or a 2nd type slot having no guard time set therefore, spreading the control information in time domain using a sequence of a 1st length for the 1st type slot or a sequence of a 2nd length for the 2nd type slot, mapping the spread control information to at least one of the 1st type slot and the 2nd type slot, and transmitting the backhaul uplink subframe including the at least one of the control information mapped 1st type slot and the control information mapped 2nd type slot.

Preferably, the sequence of the 1st length may be generated by puncturing sequence element(s) corresponding to the number of transmission symbols having the guard time set therefor in the sequence of the 2nd length.

Preferably, the method may further include the steps of determining whether the one time slot of the backhaul uplink subframe includes a sounding reference signal (SRS) transmission symbol and if the time slot includes the sounding reference signal transmission symbol, puncturing sequence element(s) corresponding to the number of the sounding reference signal transmission symbols in the sequence of the 1st length and the sequence of the 2nd length, wherein the spreading step may be performed using the sequence punctured in the puncturing step.

Preferably, in accordance with an increase of a bit-width of the control information, the control information may be modulated using either a phase or an amplitude or multiplexed on the basis of a slot.

Preferably, the control information may be transmitted by a transmission period based on HARQ (hybrid automatic repeat request) timing of a backhaul uplink and a backhaul downlink.

More preferably, the control information may be transmitted by a period amounting to an integer (1 included) multiple of 10 ms or 40 ms.

Preferably, the control information may include at least one selected from the group consisting of a scheduling request, a backhaul downlink channel measurement information and ACK/NACK for a downlink data transmission.

To further achieve these and other advantages and in accordance with the purpose of the present invention, a relay node, which transmits backhaul uplink control information to a base station, according to another embodiment of the present invention may include a 1st receiving module receiving backhaul downlink control information and data from the base station, a 1st transmitting module transmitting the backhaul uplink control information and data to the base station, a 2nd receiving module receiving access uplink control information and data from a user equipment, a 2nd transmitting module transmitting access downlink control information and data to the user equipment, and a processor connected with the 1st receiving module, the 2nd receiving module, the 1st transmitting module and the 2nd transmitting module, the processor controlling the relay node including the 1st receiving module, the 2nd receiving module, the 1st transmitting module and the 2nd transmitting module, the processor including a determining module determining whether one time slot of a backhaul uplink subframe transmitted via the 1st transmitting module is a 1st type slot including a transmission symbol having a guard time set therefor or a 2nd type slot having no guard time set therefore, a spreading module spreading the backhaul uplink control information in time domain using a sequence of a 1st length for the 1st type slot or a sequence of a 2nd length for the 2nd type slot, and a mapping module mapping the spread backhaul uplink control information to at least one of the 1st type slot and the 2nd type slot, wherein the processor may control the 1st transmitting module to transmit the backhaul uplink subframe including the at least one of the backhaul uplink control information mapped 1st type slot and the backhaul uplink control information matted mapped 2nd type slot.

Preferably, the processor may be further configured to generate the sequence of the 1st length by puncturing sequence element(s) corresponding to the number of transmission symbols having the guard time set therefor in the sequence of the 2nd length.

Preferably, the determining module may be further configured to determine whether the one time slot of the backhaul uplink subframe includes a sounding reference signal (SRS) transmission symbol. If the time slot includes the sounding reference signal transmission symbol, the processor may be further configured to puncture sequence element(s) corresponding to the number of the sounding reference signal transmission symbols in the sequence of the 1st length and the sequence of the 2nd length. And, the punctured sequence may be used by the spreading module.

Preferably, in accordance with an increase of a bit-width of the control information, the processor may be further configured to modulate the backhaul uplink control information using either a phase or an amplitude or multiplex the backhaul uplink control information on the basis of a slot.

Preferably, the processor may control the 1st transmitting module to transmit the backhaul uplink control information by a transmission period based on HARQ (hybrid automatic repeat request) timing of a backhaul uplink and a backhaul downlink.

More preferably, the processor may control the 1st transmitting module to transmit the backhaul uplink control information by a period amounting to an integer (1 included) multiple of 10 ms or 40 ms.

Preferably, the backhaul uplink control information may include at least one selected from the group consisting of a scheduling request, a backhaul downlink channel measurement information and ACK/NACK for a downlink data transmission.

The above-mentioned general description of the present invention and the following details of the present invention are exemplary and may be provided for the additional description of the invention disclosed in claims.

Advantageous Effects

According to the present invention, when control informations are transmitted to a base station from a relay node in backhaul uplink, an efficient signaling scheme is provided in consideration of a symbol structure of a backhaul uplink subframe and types of control informations.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 7 is a diagram for a resource mapping structure of PUCCH in an uplink (UL) physical resource block.

BEST MODE FOR INVENTION

Figure 1:
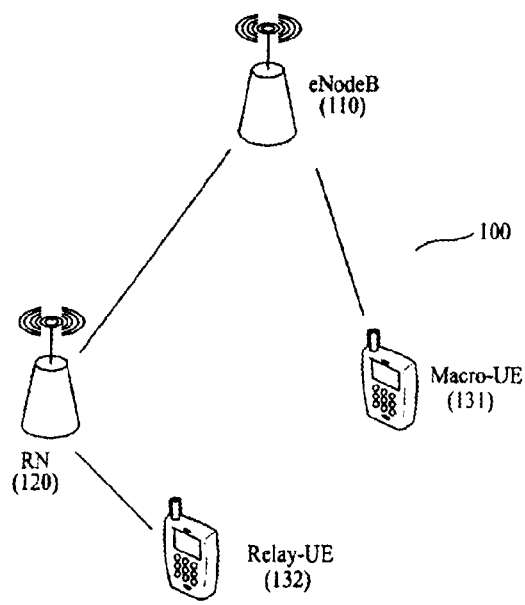
FIG. 1 is a diagram of a wireless communication system including a base station, a relay node and user equipments.
Figure 2:
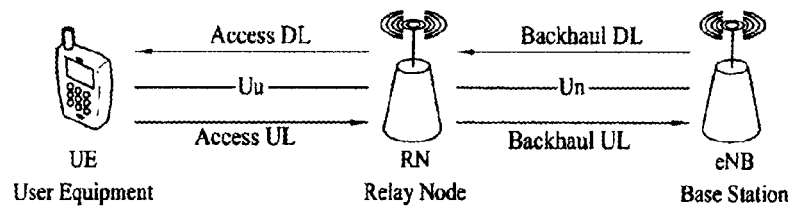
FIG. 2 is a diagram to describe links among a base station, a relay node and a user equipment.

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In this disclosure, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases.

In particular, in a network constructed with a plurality of network nodes including a base station, it is apparent that various operations performed for communication with a terminal can be performed by a base station or other networks except the base station. 'Base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

In the following description, specific terminologies used for embodiments of the present invention are provided to help the understanding of the present invention. And, the use of the specific terminology may be modified into another form within the scope of the technical idea of the present invention.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE system or 3GPP LTE-A system, by which the technical idea of the present invention may be non-limited.

Figure 3:
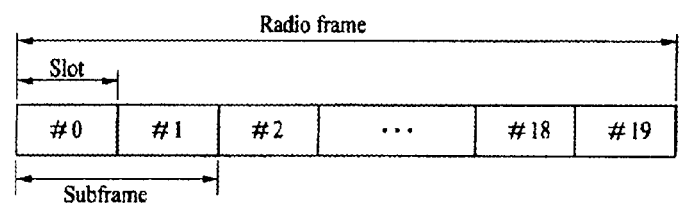
FIG. 3 is a diagram for a structure of a radio frame used by 3GPP LTE system.

FIG. 3 is a diagram for a structure of a radio frame used by 3GPP LTE system. A radio frame includes 10 subframes. Each of the subframes includes 2 slots in time domain. And, a time taken to transmit one subframe is defined as a transmission time interval (hereinafter abbreviated TTI). For instance, one subframe can have a length of 1 ms and one slot can have a length of 0.5 ms. One slot may include a plurality of OFDM symbols in time domain. Since 3GPP LTE system uses OFDMA scheme in DL, the OFDM symbol indicates one symbol length (period). And, one symbol may be called SC-FDMA symbol or symbol period. A resource block (hereinafter abbreviated RB) is a resource allocation unit and includes a plurality of contiguous subcarriers in one slot. The structure of the radio frame shown in the drawing is exemplary. Optionally, the number of subframes included in one radio frame, the number of slots included in one subframe, or the number of symbols included in one slot may be modifiable in various ways.

Figure 4:
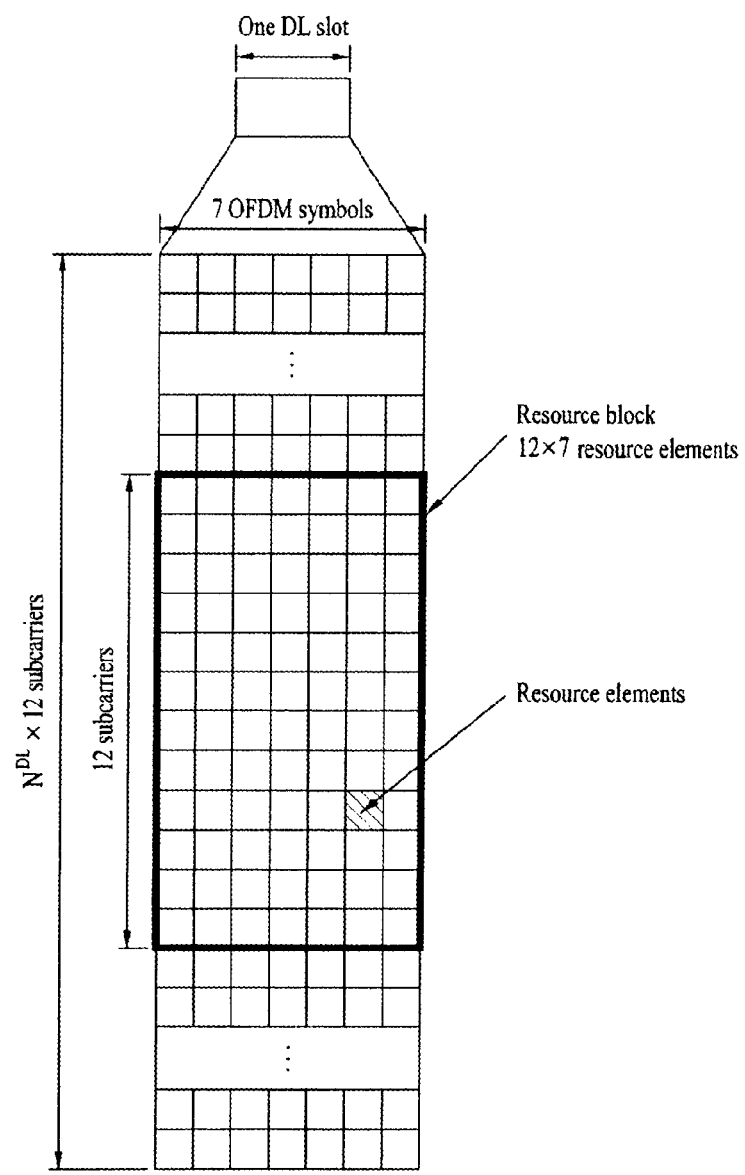
FIG. 4 is a diagram of a resource grid in a downlink slot.

FIG. 4 is a diagram of a resource grid in DL slot. Referring to FIG. 4, one DL slot may include 7 OFDM symbols in time domain and one resource block (RB) may include 12 subcarriers in frequency domain, by which the present invention may be non-limited. For instance, in case of a normal CP (cyclic prefix), one slot may include 7 OFDM symbols. In case of an extended CP, one slot may include 6 OFDM symbols. Each element on a resource grid may be named a resource element (hereinafter abbreviated RE). One resource block may include 12×7 resource elements. The number NDL of resource blocks included in a DL slot may depend on a DL transmission bandwidth. A structure of a UL slot may be identical to that of the DL slot.

Figure 5:
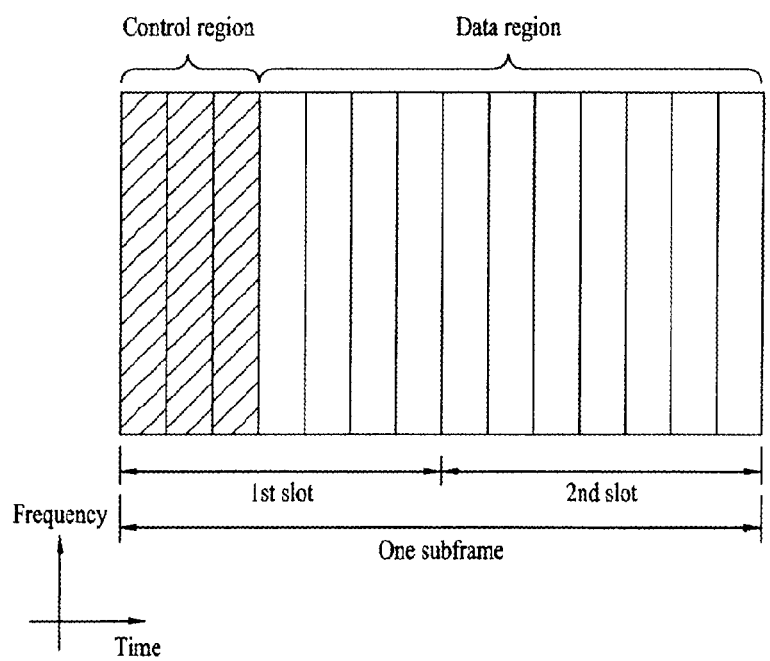
FIG. 5 is a diagram for a structure of a downlink (DL) subframe.

FIG. 5 is a diagram for a structure of a downlink (DL) subframe. Maximum 3 OFDM symbols situated in a head part of a first slot of one subframe correspond to a control region to which a control channel is allocated. The rest of OFDM symbols correspond to a data region to which PDSCH (physical downlink shared channel) is allocated. Examples of a DL control channel used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH includes HARQ ACK/NACK signal in response to a UL transmission. Control information carried on PDCCH may be called downlink control information (DCI). The DCI may include UL or DL scheduling information or a UL transmission power control command for a random UE (user equipment) group. The PDCCH may include transmission format and resource allocation information of DL-SCH (downlink shared channel), resource allocation information on UL-SCH (uplink shared channel), paging information on PCH (paging channel), system information on DL-SCH, resource allocation of such an upper layer control message as a random access response transmitted on PDSCH, transmission power control command set for individual UEs within a random UE group, transmission power control information, activation of VoIP (voice over IP) and the like. A plurality of PDCCHs can be transmitted within the control region. A user equipment may be able to monitor a plurality of the PDCCHs. The PDCCH is transmitted as an aggregation of at least one or more contiguous CCEs (control channel elements). The CCE is a logical allocation unit used to provide the PDCCH at a coding rate based on a radio channel status. The CCE may correspond to a plurality of REGs (resource element groups). A format of the PDCCH and the number of available PDCCH bits may be determined in accordance with correlation between the number of CCEs and a coding rate provided by the CCE. A base station determines a PDCCH format in accordance with a DCI which is to be transmitted to a user equipment and attaches a CRC (cyclic redundancy check) to control information. The CRC is masked with an identifier named RNTI (radio network temporary identifier) in accordance with an owner or usage of the PDCCH. For instance, if the PDCCH is provided for a specific user equipment, the CRC may be masked with an identifier (e.g., cell-RNTI (C-RNTI)) of the corresponding user equipment. In case that the PDCCH is provided for a paging message, the CRC may be masked with a paging indicator identifier (e.g., P-RNTI). If the PDCCH is provided for system information (particularly, for a system information block (SIC)), the CRC may be masked with a system information identifier and a system information RNTI (SI-RNTI). In order to indicate a random access response for a transmission of a random access preamble of a user equipment, the CRC may be masked with RA-RNTI (random access-RNTI).

Figure 6:
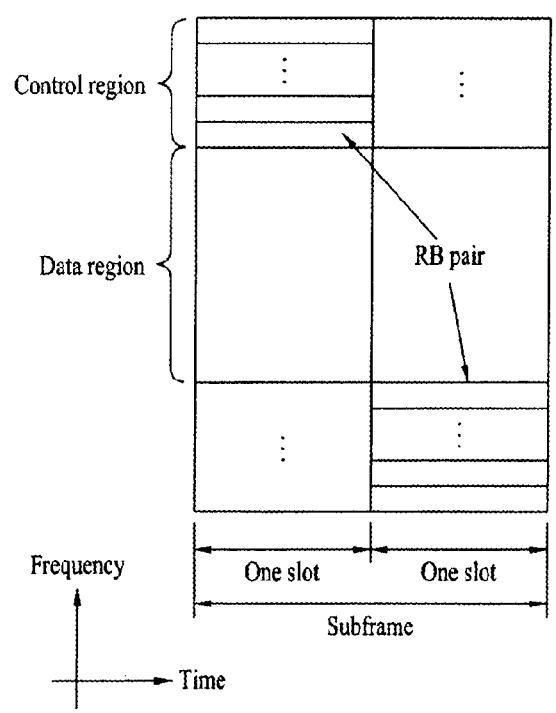
FIG. 6 is a diagram for an uplink (UL) subframe.

FIG. 6 is a diagram for an uplink (UL) subframe. A UL subframe may be divided into a control region and a data region in frequency domain. A physical UL control channel (PUCCH) including UL control information may be allocated to the control region. And, a physical UL shared channel (PUSCH) including user data may be allocated to the data region. In order to maintain single carrier property, one user equipment does not transmit PUCCH and PUSCH simultaneously. PUCCH for one user equipment may be allocated to a resource block pair (RB pair). Resource blocks belonging to the resource block pair may occupy different subcarriers for 2 slots. Namely, a resource block pair allocated to PUCCH is frequency-hopped on a slot boundary.

In the following description, a physical UL control channel (PUCCH) including UL control information may be explained in detail.

First of all, it may be able to modulate PUCCH using BPSK (binary phase shift keying) and QPSK (quadrature phase shift keying). Control information of a plurality of user equipments may be transmitted on PUCCH. If CDM (code division multiplexing) is performed to identify a signal of each of the user equipments, a CAZAC (constant amplitude zero auto-correlation) sequence having a length of 12 may be mainly used. Sine the CAZAC sequence is characterized in maintaining a predetermined amplitude in time and frequency domains, it has a property suitable for raising a coverage by lowering PAPR (peak-to-average power ratio) of a user equipment. Moreover, ACK/NACK information on a DL data transmission on PUCCH may be covered using an orthogonal sequence.

Control information carried on PUCCH may be identified using a cyclically shifted sequence having a different cyclic shift value. It may be able to generate the cyclically shifted sequence in a manner of cyclically shifting a base sequence as many as a specific CS (cyclic shift) amount. In this case, the specific CS amount may be indicated by a cyclic shift (CS) index. The number of available cyclic shifts may vary in accordance with a delay spread of a channel. Various kinds of sequences may be usable as a base sequence. And, the aforesaid CAZAC sequence may be one example of the base sequence.

PUCCH may include such control information as scheduling request (SR), DL channel measurement information, ACK/NACK information on DL data transmission and the like. Channel measurement information may include a channel quality indicator (CQI), a precoding matrix index (PMI) and a rank indicator (RI).

In accordance with a type of control information included in PUCCH, a modulation scheme and the like, PUCCH format may be defined. In particular, PUCCH format 1 is used for a transmission of SR, PUCCH format 1a or PUCCH format 1b is used for a transmission of HARQ ACK/NACK, PUCCH format 2 is used for a transmission of CQI, and PUCCH format 2a/2b is used for a transmission of CQI and HARQ ACK/NACK.

In case that HARQ ACK/NACK is singly transmitted in a random subframe, PUCCH format 1a or PUCCH format 1b may be used. In case that SR is singly transmitted in a random subframe, PUCCH format 1 may be used. A user equipment may be ale to transmit HARQ ACK/NACK and SR in a same subframe. This shall be described later.

PUCCH format may be summarized into Table 1.

TABLE 1

| PUCCH format | Modulation scheme | Number of bits per subframe | Usage | etc. |
|---|---|---|---|---|
| 1 | N/A | N/A | SR (Scheduling Request) | |
| 1a | BPSK | 1 | ACK/NACK | One codeword |
| 1b | QPSK | 2 | ACK/NACK | Two codeword |
| 2 | QPSK | 20 | CQI | Joint Coding ACK/NACK (extended CP) |
| 2a | QPSK + BPSK | 21 | CQI + ACK/NACK | Normal CP only |
| 2b | QPSK + BPSK | 22 | CQI + ACK/NACK | Normal CP only |

FIG. 7 shows a resource mapping structure of PUCCH in an uplink (UL) physical resource block. $N_{RB}^{UL}$ indicates the number of resource blocks in UL and nPRB means a physical resource block number. PUCCH is mapped to both side edges of a UL frequency block. CQI resource is mapped to a physical resource block right next to a frequency band edge. And, ACK/NACK may be mapped next to the CQI resource.

In the following description, PUCCH formats are explained in detail.

Prior to the description of PUCCH format 1, PUCCH format 1a and PUCCH format 1b are described as follows. PUCCH format 1a/1b is a control channel used for ACK/NACK transmission.

In PUCCH format 1a/1b, a symbol modulated by BPSK or QPSK modulation scheme may be multiplied by a CAZAC sequence having a length of 12. After completion of the CAZAC sequence multiplication, it is spread with an orthogonal sequence block-wise. Hadamard sequence having a length of 4 is used for normal ACK/NACK information. DFT (discrete Fourier transform) sequence having a length of 3 is used for shortened ACK/NACK information and reference signal. Hadamard sequence having a length of 2 is used for a reference signal in case of an extended CP.

Figure 8:
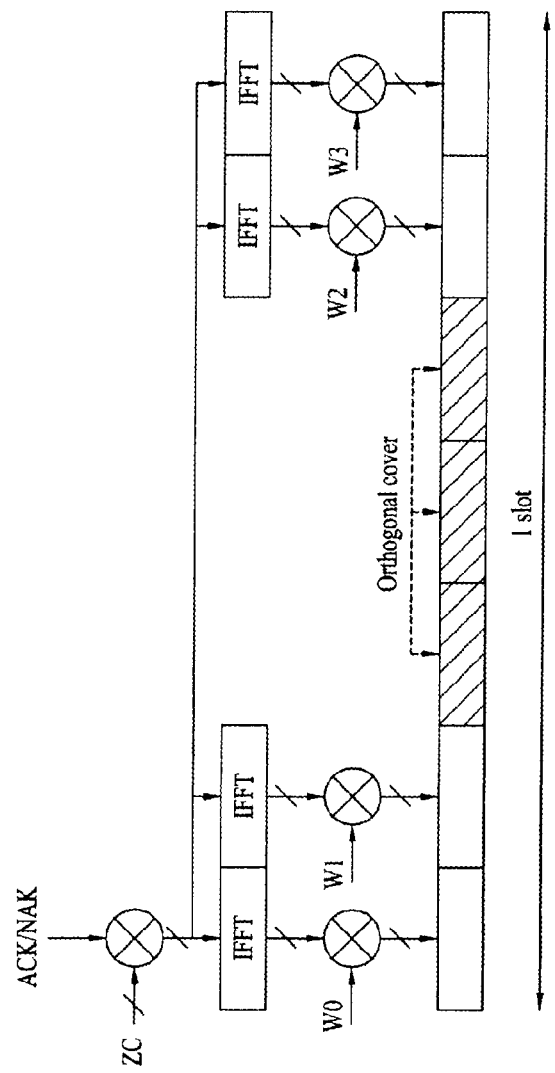
FIG. 8 is a diagram for a structure of a channel of ACK/NACK information on one slot.

FIG. 8 shows a structure of ACK/NACK channel in case of a normal CP. A reference signal (RS) is carried on 3 contiguous symbols of a middle part in 7 OFDM symbols included in one slot and an ACK/NACK signal is carried on the 4 remaining OFDM symbols. The number and location of symbols used for RS may vary in accordance with a control channel and the number and location of symbols used for an associated ACK/NACK signal may vary correspondingly. The number of ACK/NACK channels available per resource block may include 12, 18 or 36 in case of a normal CP. The number of ACK/NACK channels available per resource block may include 8 or 12 in case of an extended CP.

When a control signal is transmitted within an allocated band, 2-dimensional spreading may be applicable to increase multiplexing capacity. In particular, both frequency domain spread and time domain spread are simultaneously applied to increment the number of user equipments, which can be multiplexed, or the number of control channels. In order to spread ACK/NACK signal in frequency domain, a frequency domain sequence may be used as a base sequence. Zadoff-Chu (ZC) sequence corresponding to one of CAZAC sequences may be used as a frequency domain sequence. The frequency-domain-spread ACK/NACK signal undergoes IFFT and is then spread in time domain using a time domain sequence. For instance, ACK/NACK signal may be spread using an orthogonal sequence (w0, w1, w2, w3) having a length of 4 for 4 symbols. And, RS may be spread through an orthogonal sequence having a length of 3. This may be called 'orthogonal covering'.

Examples of sequences used for the spread of ACK/NACK information may be shown in Table 2 and Table 3. Table 2 shows a sequence for a length-4 symbol. Table 3 shows a sequence for a length-3 symbol. A sequence for a length-4 symbol may be used for PUCCH format 1/1a/1b of a general subframe configuration. In consideration of a case that SRS (sounding reference signal) is transmitted on a last symbol of a 2nd slot in a subframe configuration, a sequence for a length-4 symbol may be applied to a 1st slot and a shortened PUCCH format 1/1a/1b of a sequence for a length-3 symbol may be applied to a 2nd slot.

TABLE 2

| Sequence Index | [w(0), w(1), w(2), w(3)] |
| --- | --- |
| 0 | [+1 +1 +1 +1] |
| 1 | [+1 −1 +1 −1] |
| 2 | [+1 −1 −1 +1] |

TABLE 3

| Sequence Index | [w(0), w(1), w(2)] |
| --- | --- |
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Meanwhile, one example of an orthogonal sequence used for a spread of RS of ACK/NACK channel is shown in Table 4.

TABLE 4

| Sequence Index | Normal CP | Extended CP |
| --- | --- | --- |
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Figure 9:
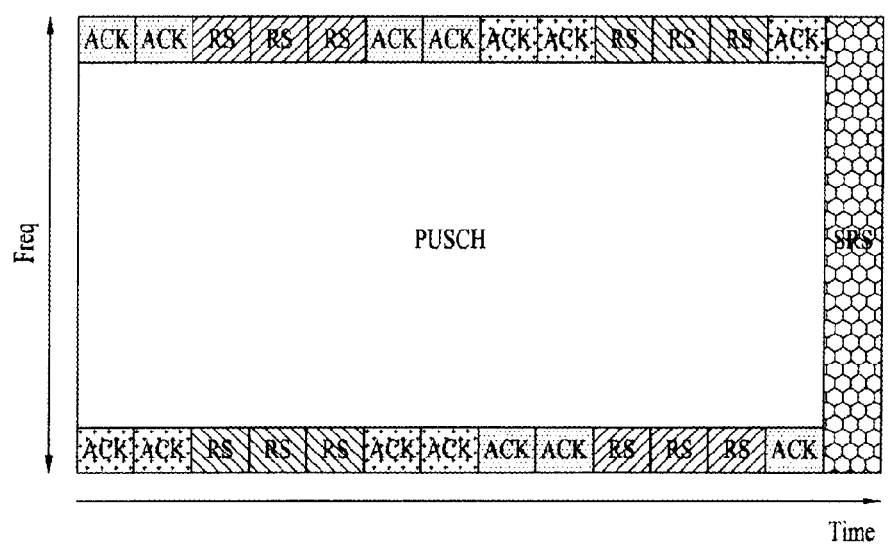
FIG. 9 is a diagram of a resource mapping structure in case of applying a shortened ACK/NACK format.

FIG. 9 is a diagram of a resource mapping structure in case of applying a shortened ACK/NACK format. A shortened ACK/NACK format may be used if both ACK/NACK and a sounding reference signal (SRS) need to be simultaneously transmitted. And, the shorted ACK/NACK format may be set by an upper layer signaling.

In the following description, PUCCH format 1 is explained. The PUCCH format 1 is a control channel used for SR transmission.

Scheduling request (SR) is transmitted in a manner that a user equipment requests to be scheduled or does not request to be scheduled. SR channel reuses ACK/NACK channel structure in PUCCH format 1a/1b and is configured by OOK (on-off keying) scheme based on ACK/NACK channel design. A reference signal is not transmitted on SR channel. Hence, a sequence having a length of 7 is used for a normal CP. And, a sequence having a length of 6 is used for an extended CP. Different cyclic shifts or orthogonal covers may be applied to SR and ACK/NACK, respectively.

Figure 10:
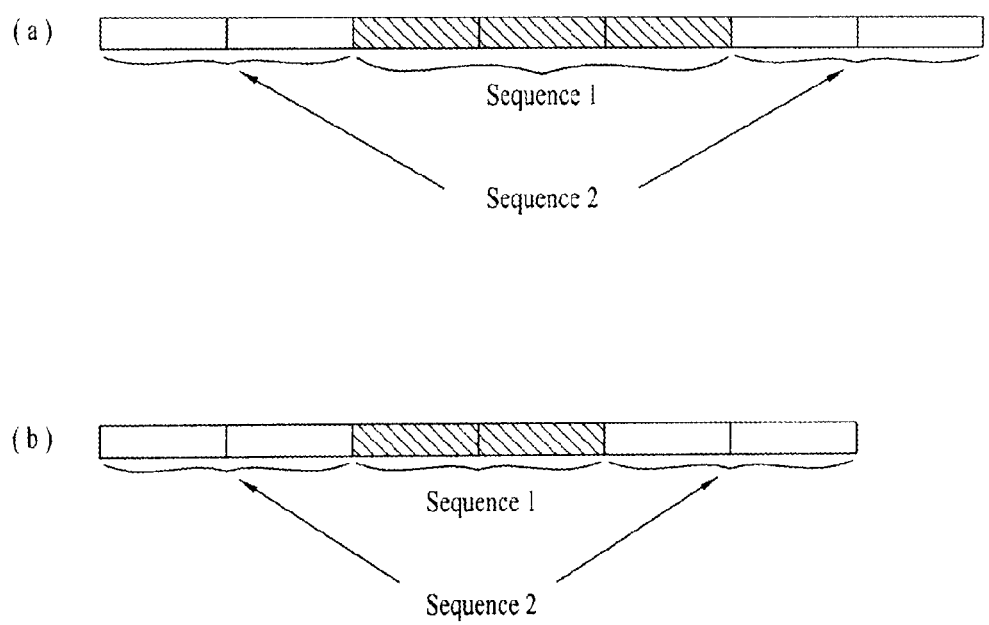
FIG. 10 is a diagram for a structure of a channel of a scheduling request for one slot.

FIG. 10 shows a structure of a channel of a scheduling request in one slot. Referring to FIG. 10 (a), in case of a normal CP, a sequence having a length of 7 is separated into 2 orthogonal sequences (i.e., sequence 1 and sequence 2). Referring to FIG. 10 (b), in case of an extended CP, a sequence having a length of 6 is separated into 2 orthogonal sequences (i.e., sequence 1 and sequence 2).

Figure 11:
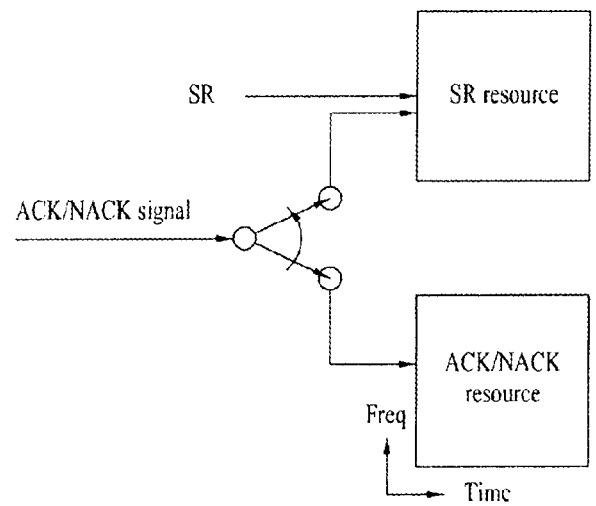
FIG. 11 is a diagram of a resource allocation structure for a simultaneous transmission of ACK/NACK information and a scheduling request.

With reference to FIG. 11, a case of transmitting ACK/NACK information and SR simultaneously is described as follows. As mentioned in the foregoing description, a user equipment may be able to transmit HARQ ACK/NACK and SR in a same subframe. For a positive SR transmission, a user equipment transmits HARQ ACK/NACK on a resource allocated for SR. For a negative SR transmission, a user equipment transmits HARQ ACK/NACK on a resource allocated for ACK/NACK.

In the following description, PUCCH format 2/2a/2b is explained. PUCCH format 2/2a/2b is a control channel to transmit channel measurement feedback (CQI, PMI, RI).

According to PUCCH format 2/2a/2b, modulation by CAZAC sequence is supported and a QPSK modulated symbol is multiplied by CAZAC sequence having a length of 12. A cyclic shift of a sequence may be changed between a symbol and a sot. Orthogonal covering is used for a reference signal (RS).

Figure 12:
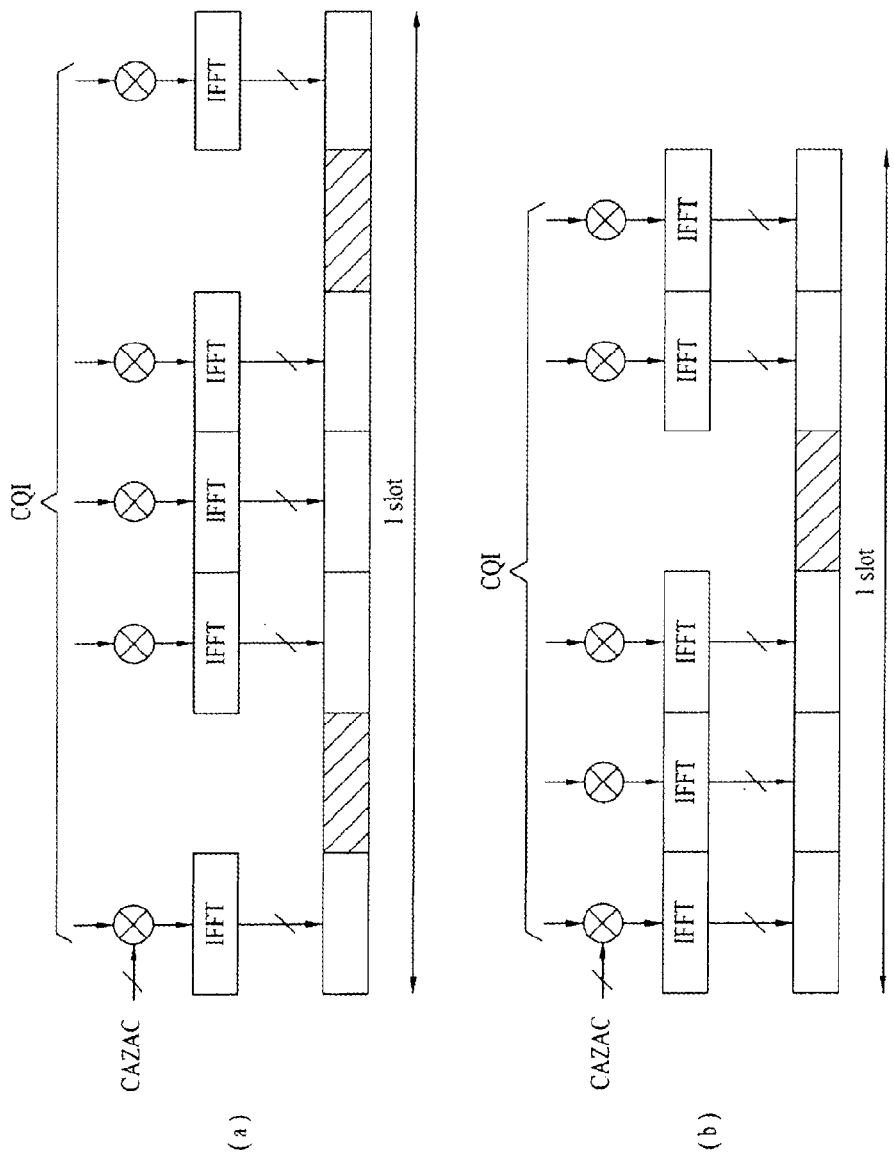
FIG. 12 is a diagram for a channel structure of CQI information bit for one slot.

FIG. 12 is a diagram for a channel structure of CQI information bits. First of all, CQI information bits may include at least one or more fields. For instance, CQI field indicating CQI index to determine MCS, PMI field indicating an index of a precoding matrix in a codebook, RI field indicating a rank and the like may be included in the CQI information bits.

Referring to FIG. 12 (a), a reference signal (RS) is carried on 2 SC-FDMA symbols spaced apart from by an interval of 3 SC-FDMA symbols in 7 SC-FDMA symbols included in one slot, while CQI information is carried on the 5 remaining SC-FDMA symbols. Two reference signals (RSs) are used within one slot to support a high-speed user equipment. Each user equipment may be identifiable using a sequence. CQI information symbols are modulated and delivered to all SC-FDMA symbols. And, SC-FDMA symbols include one sequence. In particular, a user equipment modulates and transmits CQI with each sequence.

The number of symbols transmittable in one TTI is 10 and modulation of CQI information is determined up to QPSK. When QPSK mapping is used for SC-FDMA symbol, since 2-bit CQI value may be carried, 10-bit CQI value may be carried on one slot. Hence, maximum 20-bit CQI value may be carried on one subframe. In order to spread CQI information, a frequency domain spread code is used.

CAZAC sequence (e.g., ZC sequence) may be used as a frequency domain spread code. Moreover, another sequence having good correlation property may be applied as a frequency domain spread code. In particular, each control channel may be identifiable in a manner of applying CAZAC sequence having a different cyclic shift value. IFFT is performed on the frequency-domain-spread CQI information.

FIG. 12 (b) shows an example of PUCCH format 2/2a/2b transmission in case of an extended CP. One slot includes 6 SC-FDMA symbols. RS is carried on one of 6 OFDM symbols of each slot and CQI information bit is carried on the remaining 5 OFDM symbols. Except this, the former example of the case of the normal CP shown in FIG. 12 (a) is exactly applied to the case of the extended CP.

Orthogonal covering used for the RS shown in FIG. 12 (a) or FIG. 12 (b) is shown in Table 5.

TABLE 5

| Normal CP | Extended CP |
|-----------|-------------|
| [1 1]     | [1]         |

Figure 13:
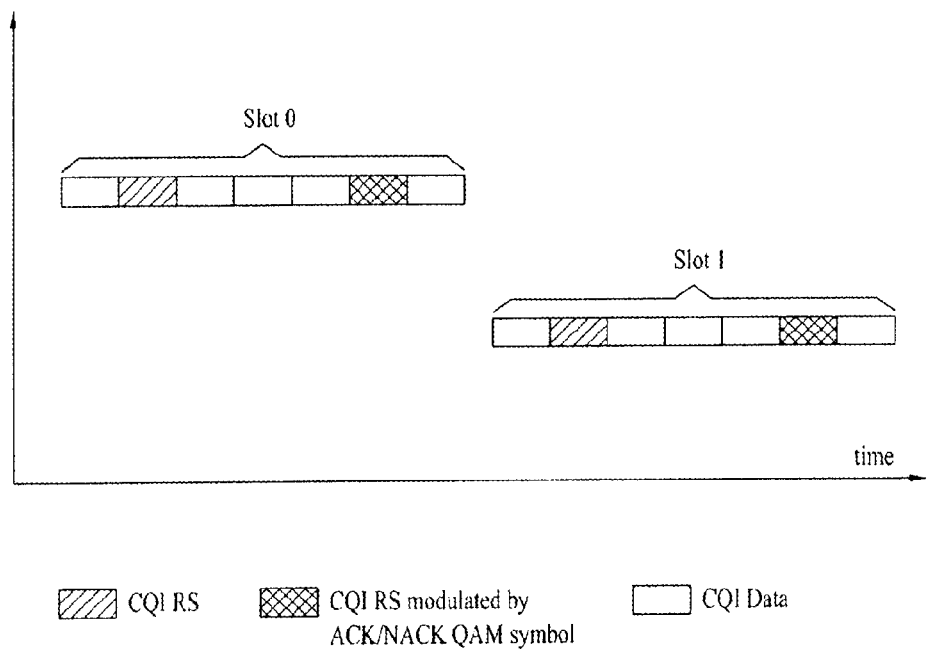
FIG. 13 is a diagram of a channel structure related to a simultaneous transmission of CQI information and ACK/NACK information.

Simultaneous transmission of CQI information and ACK/NACK information is described with reference to FIG. 13 as follows.

First of all, in case of a normal CP, it may be able to simultaneously transmit CQI information and ACK/NACK information using PUCCH format 2a/2b. The ACK/NACK information may be carried on the symbol that carries the aforesaid CQI RS shown in FIG. 12. In particular, in case of the normal CP, a 2nd RS is modulated into ACK/NACK symbol. In case that ACK/NACK symbol is modulated by BPSK scheme like PUCCH format 1a, CQI RS is modulated into ACK/NACK symbol by BPSK scheme. In case that ACK/NACK symbol is modulated by QPSK scheme like PUCCH format 1b, CQI RS is modulated into ACK/NACK symbol by QPSK scheme. Meanwhile, in case of an extended CP, CQI information and ACK/NACK information are simultaneously transmitted using PUCCH format 2. For this, CQI information and ACK/NACK information are joint-coded.

In a backhaul downlink (DL) from a relay node (RN) to a base station (eNB), as mentioned in the foregoing description, uplink (UL) physical layer (L1) control informations are transmitted. Types of the physical layer control informations transmitted in the backhaul UL may be categorized into scheduling request (SR), relay node DL channel measurement information (corresponding to the previous CQI, PMI or RI) and HARQ ACK/NACK for DL PUSCH transmission.

The above-mentioned control informations, which are transmitted from a macro-UE (e.g., UE receiving a service from a base station in direct) to a base station, are configured in form of a dedicated physical control channel [PUCCH format 1 (SR), PUCCH format 1a/1b (1/2 bit ACK/NACK), PUCCH format 2 (CQI/PMI/RI), PUCCH format 2a/2b (CQI/PMI/RI+1/2 bit ACK/NACK)] and may be transmitted via a physical resource block (PRB) designated at a system band edge position if necessary.

Various embodiments of the present invention explained in the following description are devised in consideration of necessity and transmission scheme for the above-mentioned UL physical layer control information in backhaul UL from a relay node to a base station.

In this specification, PDCCH transmitted from a base station to a relay node (e.g., PDCCH transmitted via a resource region receivable by a relay node in a random DL subframe) may be represented as a relay-PDCCH (R-PDCCH) to be identifiable from PDCCH transmitted to a macro-UE from a base station. Similarly, PUCCH transmitted from a relay node to a base station may be represented as R-PUCCH.

In the following description, scheduling request, channel measurement information and ACK/NACK information are sequentially explained in accordance with types of UL physical layer control information.

Scheduling Request

In order for a relay node to transmit UL data to a cell base station in backhaul UL, it may be necessary to consider whether the relay node needs to send a scheduling request message, which is sent to receive designations of a resource application, a modulation and coding scheme (MCS) and a transmission mode, to a base station via UL grant PDCCH (physical DL control channel) or R-PDCCH (relay-physical DL control channel). Various embodiments in the following description are devised in consideration of directionality for a resource allocation scheme of a cell base station scheduler for a backhaul uplink (UL) and a control information configuration.

1st Embodiment

A 1st embodiment of the present invention relates to a method of not defining a scheduling request in a relay node backhaul UL.

When relay-UEs are sufficiently present in a random relay node area, it may be highly probable that data received in access link from the relay-REs to a relay node exist sufficiently and that data to be sent to a base station exist in a UL transmission buffer of the relay node. A transmission resource allocation (e.g., allocation of transmission frame) of a relay node backhaul UL may be configured semi-static from RRC parameters set by an upper layer through a cell-specific RRC (radio resource control) signaling or an RN-specific (or a UE-specific) RRC signaling. And, a transmission resource of a relay node backhaul UL may be allocated semi-statically and indirectly or implicitly through a cell-specific RRC signaling or a UE-specific RRC signaling set by an upper layer for a relay node backhaul DL.

If this fact is taken into consideration, since a subframe allocation for a relay node backhaul UL may be configured by RRC parameter, it may be unnecessary for a relay node to separately send a 1-bit scheduling request message to L1/L2 UL scheduler of a cell base station.

In particular, a subframe allocation for a relay node backhaul UL is configured semi-static by a cell-specific or relay-specific (or UE-specific) RRC signaling of a cell base station and each relay node performs blind decoding on UL grant PDCCH (or R-PDCCH) in subframe behind 'A' subframes from a corresponding subframe for a prescribed subframe transmission, whereby a presence or non-presence of a transmission in the corresponding subframe, a resource allocation and a transmission mode may be obtained. In particular, a relay node may operate by considering that a session has been set without sending a scheduling request message to a base station. In this case, a value of 'A' is basically set to 4 or may be set to one of 3 to 5. In consideration of a status of the subframe allocation for the relay node backhaul UL, the base station may be able to send a UL grant in a subframe that meets a reference of the value of 'A' to the maximum. For instance, a scheme of a relay node backhaul UL transmission by setting a value of 'A' to 4 and a transmission of UL grant PDCCH (or R-PDCCH) for the relay node backhaul UL transmission or a scheme of a relay node backhaul UL transmission by setting a value of 'A' to 3 or 5 instead of 4 and a transmission of UL grant PDCCH (or R-PDCCH) for the relay node backhaul UL transmission may be implemented in a manner of being selected by an upper layer cell-specific or RN-specific (or UE-specific) RRC signaling.

A relay node may be able to determine a possibility of a transmission of a subframe set for the relay node itself in accordance with a presence or non-presence of a detection of UL grant PDCCH (or R-PDCCH). As mentioned in the foregoing description, a method of using blind decoding of a UL grant may be applicable if a dynamic channel-dependent scheduling is applied in a frequency domain region of a relay node backhaul UL.

Meanwhile, as a relay node has stationary or nomadic mobility, a relay node UL channel may have a very slow variation for a time or an almost time-invariant property. In this case, a transmission period of SRS for UL channel sounding may be set long. To support this, configurations for the transmission having a period longer than an SRS transmission period defined in the conventional 3GPP LTE system (Release 8 or Release 9) may be configured by cell-specific or RN-specific (or UE-specific) RRC parameters signaled by an upper layer.

A bandwidth for transmitting SRS may be basically set to a whole bandwidth. Yet, in case that a plurality of transmitting antennas are used, a relatively small SRS bandwidth may be configured to secure PSD (power spectral density) suitable for multiplexing for SRS per antenna (or layer) and channel measurement.

Considering this, in UL grant PDCCH (or R-PDCCH) for applying channel-dependent scheduling, since a transmission period is set suitable for a relay node backhaul UL channel characteristic despite applying a transmission function, one UL grant PDCCH (or R-PDCCH) may be transmitted per 'z' backhaul UL transmission subframes (or a transmission of a corresponding backhaul UL physical data channel (e.g., PUSCH or R-PUSCH) in 'Z' time domains) for a random relay node [cf. UL grant PDCCH (or R-PDCCH) is provided for transmission frequency resource allocation and transmission MCS and transmission mode designation]. In this case, 'Z' is greater than 1 (Z>1) and may have a considerably large value.

Likewise, one DL channel allocation PDCCH (or R-PDCCH) may be transmitted per 'Y' backhaul DL transmission subframes (or a transmission of a corresponding backhaul DL physical data channel (e.g., PUSCH or R-PUSCH) in 'Y' time domains) for a random relay node [cf. DL channel allocation PDCCH (or R-PDCCH) is provided for transmission frequency resource allocation and transmission MCS and transmission mode designation]. In this case, 'Y' is greater than 1 (Z>1) and may have a considerably large value. Moreover, Y may be equal to or different from Z.

In case that semi-persistent scheduling (SPS) is applied to a relay backhaul UL and/or DL data transmission, control information for transmission frequency resource allocation and transmission MCS and transmission mode designation may be transmitted in a manner of being included in SPS activation control channel DCI (downlink control information) as a prescribed PDCCH (or R-PDCCH). Moreover, a corresponding control information for cancellation of the transmission frequency resource allocation and transmission MCS and transmission mode designation may be included in SPS cancellation control channel DCI format. This DCI format may be defined by reusing a previous specific DCI format. And, the above control information may be delivered in a manner of interpreting a specific DCI format by a new scheme (i.e., original control information bit fields are interpreted in a manner of being designated different as SPS activation control information or SPS cancellation control information).

Control information for transmission frequency resource allocation and transmission MCS and transmission mode designation may be transmitted on PDSCH (or R-PDSCH) in a manner of RN-specific (or UE-specific) RRC signaling or MAC message. If control information for separately canceling the transmission frequency resource allocation and the transmission MCS and transmission mode designation is defined, this control information may be transmitted on PDSCH (or R-PDSCH) in a manner of RN-specific (or UE-specific) RRC signaling or MAC message as well.

A control channel transmission scheme according to a scheduling scheme described in this specification may be applicable to a general situation of a relay node backhaul UL and/or a relay node backhaul DL irrespective of a presence or non-presence of a transmission of a scheduling request (SR).

Moreover, the following items may be applicable to the 1st embodiment of the present invention and other embodiments of the present invention explained in the following description.

For the controlling signaling for a relay node to transmit its buffer status to a cell base station scheduler via a periodic UL RRC signaling and to control a session to be initiated or cancelled in aspect of backhaul UL radio resource management (RRM), RN-specific (or UE-specific) RRC signaling may be defined. For the control signaling related to such an RRC function as a function of controlling a session with a relay node in viewpoint of a cell base station, cell-specific or RN-specific (or UE-specific) RRC signaling may be basically usable.

In order to transmit session initiation/cancellation control information to a relay node more quickly to prepare for an RRC signaling scheme of the session control information, L1/L2 PDCCH (or R-PDCCH) control signaling may be taken into consideration. In particular, control information on session initiation and session cancellation may be transmitted by a PDCCH (or R-PDCCH) dedicated scheme of not requesting PDSCH or R-PDSCH decoding subsequent to PDCCH (or R-PDCCH) decoding. Moreover, control information may be signaled via a specific DCI format (e.g., through a reuse and/or new interpretation of some bit fields of the specific DCI format). In this case, the control information may be transmitted as PDCCH itself to a relay node or may be used by defining a new DCI format.

On a prescribed PDSCH decoded according to a PDCCH transmission, modification information associated with a transmission of a different type may be transmitted as well as the information on the session initiation and cancellation.

2nd Embodiment

2nd embodiment of the present invention relates to a method of reusing PUCCH format 1 for scheduling request information transmission.

The above-mentioned 1st embodiment considers the following fact. First of all, when a plurality of user equipments are present in a relay node area, it is highly probable that the relay node may have UL data or control information to transmit via a transmission resource allocated by a cell base station in a prescribed time interval.

According to the 2nd embodiment of the present invention, a function for a relay node to make a request for a resource allocation in accordance with its buffer status is provided not in a situation of the above-mentioned resource allocation. In particular, as a UL transmission resource use by a relay node is dynamically scheduled by a cell base station, a scheme for a macro-UE to make a scheduling request (SR) to a base station may be exactly applicable to a relay node backhaul UL resource allocation scheme. Accordingly, UL resource allocation of PUCCH format 1 for SR transmission may be configured through RN-specific (or UE-specific) RRC signaling from a cell base station.

Modification of PUCCH Format 1

A method of modifying to use a slot-based PUCCH format 1 is described as follows.

First of all, for instance, in case of an in-band relay node, if an access UL reception of a relay node and a backhaul UL transmission of the relay node are performed at the same time, it may cause a problem that a transmitted signal works as a considerable interference on a receiving stage. Hence, an access link reception and a backhaul link transmission (or an access link transmission and a backhaul reception) may be multiplexed by TDM (time division multiplexing). In case of such a half-duplex relay node, a time for a switching between a transmission function and a reception function is taken and a guard time needs to be defined correspondingly. The guard time may be set to a value of at least one symbol interval on a subframe or may be occasionally set to a time sample value corresponding to a half of a symbol interval for an optimized guard time. Moreover, it may be necessary to define a guard time on a backhaul link subframe in consideration of backward compatibility to support a user equipment according to a legacy system.

Figure 14:
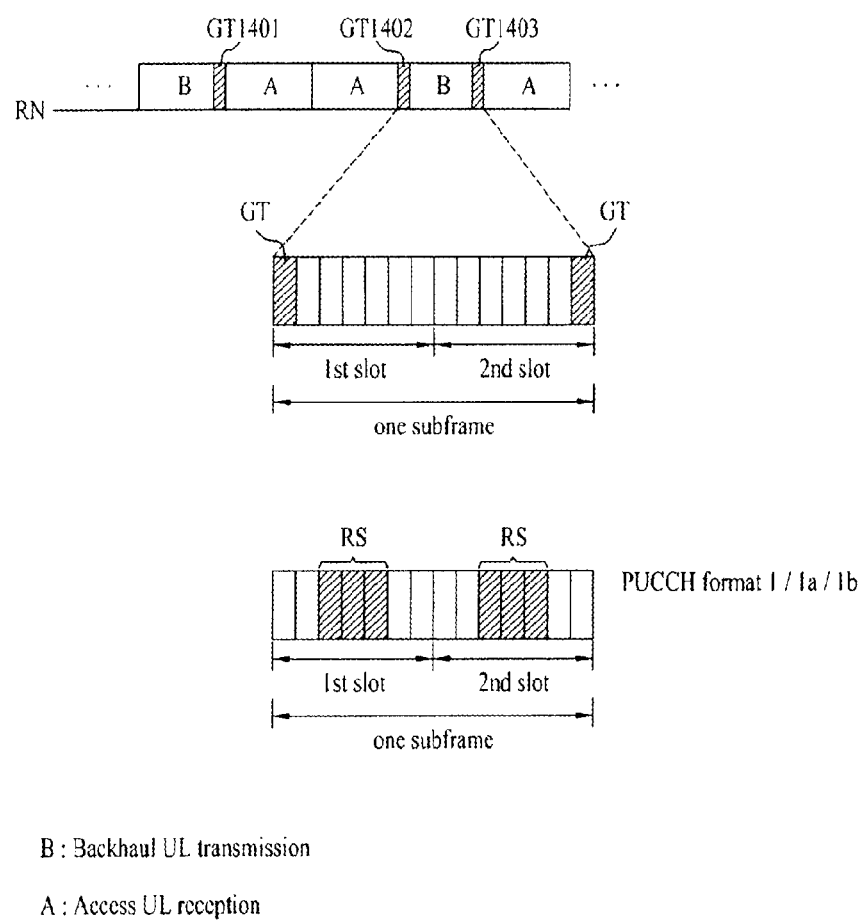
FIG. 14 is a diagram of backhaul uplink transmission and access uplink reception subframe structures of a relay node.

FIG. 14 is a diagram for backhaul uplink transmission and access uplink reception operations of a relay node in time domain (by subframe unit).

In case that a relay node switches a backhaul UL transmission function to an access UL reception function, a guard time may be set at a last symbol part 1401/1403 of a backhaul UL. In case that a relay node switches an access UL reception function to a backhaul UL transmission function, a guard time may be set at a first symbol part 1402 of a backhaul UL. In this case, whether to substantially apply a guard time to a first symbol part or a last symbol part in a random backhaul UL subframe may be determined in accordance with a relation between a backhaul UL subframe transmission timing and an access UL subframe reception timing, i.e., a presence or non-presence of a timing offset setting or a setting value. For instance, if a backhaul UL subframe transmission timing is delayed more than an access UL subframe reception timing by a half interval of OFDM symbol in a relay node, a guard time may be set at a first symbol of a backhaul UL subframe. On the contrary, if a backhaul UL subframe transmission timing is set to precede an access UL subframe reception timing by a half interval of OFDM symbol in a relay node, a guard time may be designated to a last symbol of a backhaul UL subframe or to a last symbol of an access UL subframe.

In particular, a guard time may be designated to a first part, a last part or both of the first part and the last part of a backhaul UL transmission subframe of a relay node. By considering such a designation, it may be necessary to modify a channel structure of a conventional PUCCH format 1 in a relay node backhaul link. In particular, regarding channel structures of PUCCH format 1 series, in case of a normal CP, 3 symbols contiguous to each other in the middle of 7 symbols of one slot may be used for a reference signal (RS) transmission and 1st, 2nd, 6th and 7th symbols may be used for a transmission of data (e.g., control information). In this case, a guard time is set at each of the 1st symbol and the 7th symbol, whereby the channel structures of the conventional PUCCH format 1 series may not be exactly applied.

Regarding a 2nd slot of one subframe, a channel configuring method of the shortened PUCCH format 1/1a/1b has been designed in consideration of SRS transmission (e.g., SRS transmitted on a last symbol of subframe). Hence, in case that a guard time is set at a last symbol of a 2nd slot of one subframe, it may be able to use the above-mentioned shortened format for the SRS transmission. Considering that this shortened format is usable cell-specifically, a new channel configuration for a relay node operation may not be necessary. Accordingly, in case that there exists at least one relay node having a guard time set at a last part of a subframe in a random cell, if macro-UEs transmit scheduling requests as well as a relay node in UL subframe for which a relay node backhaul UL transmission is set as well as SRS transmission time, all the macro-UEs may be able to apply a method of transmitting a shortened PUCCH format 1 in 2nd slot. Alternatively, in case that a guard time is set at a last part of a subframe in at least one relay node, it may be able to configure a shortened PUCCH format 1 to be applied RN-commonly or RN-specifically. In this case, PUCCH frequency resource setting for the applied shortened PUCCH format 1 may be set identifiable from the frequency resource setting for other transmissions of general PUCCH format 1 in viewpoint of PRB.

Figure 15:
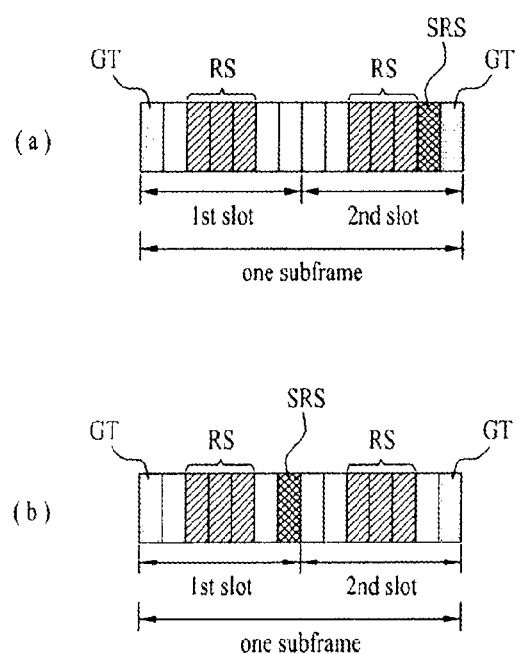
FIG. 15 is a diagram of PUCCH channel structure in a backhaul uplink subframe.

Meanwhile, referring to FIG. 15 (*a*), in order to enable a base station to receive SRS at the same timing in consideration of a UL subframe timing alignment and the like, a position of SRS transmission symbol may be defined differently (e.g., 2nd symbol of a last part). if a changed SRS transmission symbol position and a guard time are simultaneously taken into consideration, the number of symbol(s) usable for a data (control information) transmission in one slot may become 2. In particular, referring to a 2nd slot shown in FIG. 15 (*a*), when PUCCH format 1 series is applied, in case of a normal CP, contiguous symbols in the middle of 7 symbols are used for a reference signal (RS) transmission, a guard time may be set at a last symbol, and a symbol right ahead of the last symbol may be usable for an SRS transmission. Hence, 2 symbols of a head part may be usable for a control information transmission only. Accordingly, an orthogonal cover (e.g., Walsh cover) having a length of 2 or a cover sequence of a type, in which 2 elements at a prescribed position of an orthogonal cover having a length of 4 are punctured, may be applicable.

Meanwhile, regarding a configuration of a 1st slot of one subframe, it may consider a situation that a switching interval is set at a head region of a subframe. For this, a shortened PUCCH format 1 channel configuration of a new type is required. In particular, a cyclic shift for a reference signal (RS) and an orthogonal cover are applied in the same manner of the conventional PUCCH format 1 channel configuration and a channel configuration related to a data (control information) transmission may be modified. In more particular, when an orthogonal sequence for a data transmission is applied, in case that a switching interval is set at a first symbol of a subframe, it may be able to apply an orthogonal cover having a length of 3 to start with a 2nd symbol. The orthogonal cover having the length of 3 may use a DFT based orthogonal cover or a quasi-orthogonal sequence of a type generated from puncturing a 1st element of an orthogonal cover having a length of 4. This type of the sequence having the length of 3 may be called a simplex code sequence.

The above-modified PUCCH format 1 may be selectively usable or may be set by a cell-specific or RN-specific (or UE-specific) RRC signaling. In case of the setting by the cell-specific RRC signaling, the above-mentioned DFT based orthogonal cover may be applicable. In case of the setting by the RN-specific (or UE-specific) RRC signaling, a cover of a simplex code type may be applicable.

Referring to FIG. 15 (*b*), it may be able to consider a case that a position of SRS transmission symbol is defined at a random position (e.g., a 1st transmission symbol of a 1st slot)

in a 1st slot of a subframe. In this case, the number of data (control information) transmission symbols in a 1st slot of one subframe may become 2 or 3 in accordance with a presence or non-presence of a guard time application to a 1st OFDM symbol part of the 1st slot. In particular, in case of a normal CP, among 7 symbols configuring one slot, RS is situated at 3 symbols, a guard interval is situated at a foremost symbol, and SRS is situated at a last symbol. Hence, the number of symbols usable for a data transmission may become 2 or 3. In case that the number of data transmission symbols is 2, it may be able to apply a cover sequence having a type in which 2 elements at a prescribed position in an orthogonal cover (e.g., Walsh cover) having a length of 2 or an orthogonal cover having a length of 3 are punctured. Meanwhile, in case that the number of data transmission symbols is 3, it may be able to apply a cover sequence having a type in which 1 element at a prescribed position in an orthogonal cover (e.g., Walsh cover) having a length of 3 or an orthogonal cover having a length of 4 is punctured.

Like the case that guard times are defined at first and last parts of a subframe, the application of a shortened PUCCH (or R-PUCCH) format of a 2nd slot of a subframe and the application of a shortened PUCCH (or R-PUCCH) format of a 1st slot may be synchronized together by an RRC signaling (cell-specific or RN-specific) configured by an upper layer. In particular, as the PUCCH (or R-PUCCH) applied format of the 1st slot and the PUCCH (or R-PUCCH) applied format of the 2nd slot are identifiable from each other, a presence or non-presence of a configuration may be synchronized by an RRC signaling (cell-specific or RN-specific) configured as a separate parameter by an upper layer.

Moreover, it may be able to consider an additional modification of a channel configuration of PUCCH format 1 in accordance with an SRS transmission scheme or a definition of a guard time on a backhaul UL subframe as well as a presence or non-presence of an SRS transmission on a relay node backhaul UL. Accordingly, an additional (cell-specific or RN-specific) RRC parameter for a presence or non-presence of format application per additional slot may be defined and applied.

Figure 16:
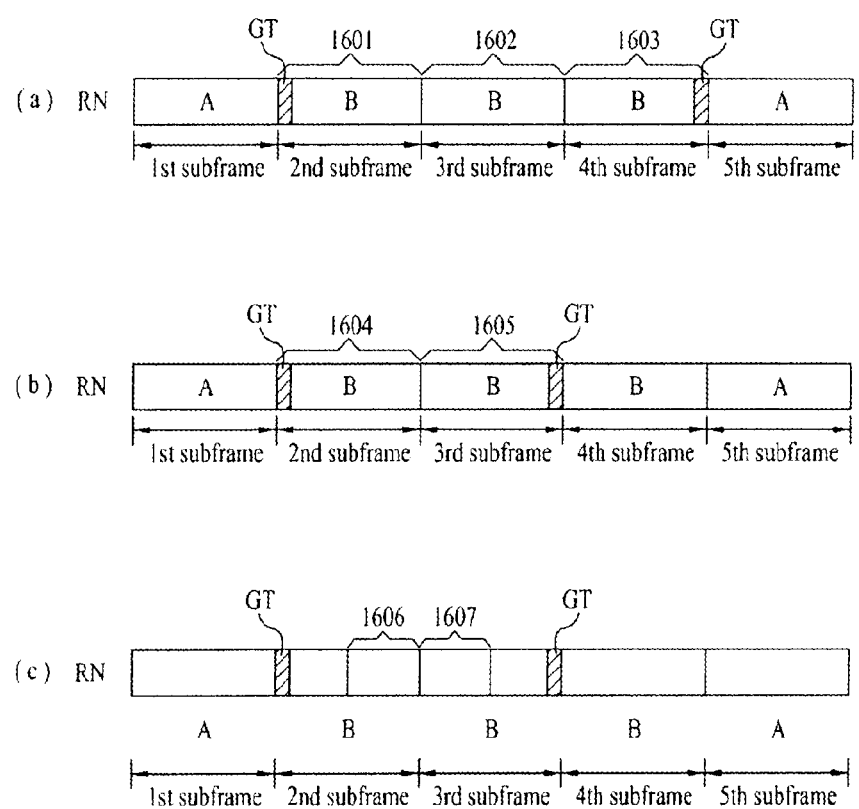
FIG. 16 is a diagram for a guard time according to a backhaul uplink setting.

Referring to FIG. 16 (a), in case that a relay node backhaul UL is set in at least 3 contiguous subframes 1601 to 1603, a guard time may not be set at the subframe 1602 except the foremost subframe 1601 and the last subframe 1603. For this subframe 1602, PUCCH format defined in the conventional 3GPP LTE system may be intactly usable as PUCCH (or R-PUCCH) format for a scheduling request.

Referring to FIG. 16 (b), in case that a relay node backhaul UL is set in 2 contiguous subframes 1604 and 1605, a guard time may be set at a fore transmission symbol part in a former subframe 1604 only and a guard time may be set at a 1st transmission symbol part of a latter subframe 1605 only.

In consideration of the above symbol configuration of the relay node backhaul UL subframe, the SRS transmission setting configuration and the channel configuration according to the PUCCH (or R-PUCCH) format including the schedule request (RS) may be set in association with each other. For instance, using the time-invariant property of a channel of a relay node, SRS may be configured to be only transmitted in subframes [e.g., subframes 1601 and 1602 shown in FIG. 16 (a) or subframe 1604 shown in FIG. 16 (b)] in which a guard time (GT) for a transmission/reception function switching function is not set at a last transmission symbol part among subframes allocated to a relay node backhaul UL.

The above setting may be implemented using RRC parameters that configure SRS transmission period, band, position and the like for a random relay node. This SRS transmission configuration may be set through UL subframe setting information that is implicitly set by relay node backhaul DL configuration information configured by an upper layer through a cell-specific or RN-specific RRC signaling. Alternatively, the above-mentioned SRS transmission configuration may be set in association with relay node backhaul UL configuration information configured by an upper layer through a cell-specific or RN-specific RRC signaling.

Meanwhile, in accordance with SRS transmission frame and timing configuration set by cell-specific and RN-specific RRC parameters set for a random relay node, the relay node backhaul DL or UL subframe configuration, which is configured by an upper layer, may be set in a manner of being matched in the SRS transmission subframe not to define a guard time (GT) in a relay node backhaul UL subframe.

Regarding PUCCH (or R-PUCCH) formats including scheduling requests, PUCCH (or R-PUCCH) formats of modified types may be usable in accordance with configurations of guard times (GT) within subframes set for relay node backhaul UL transmissions. In this case, a relay node and a cell base station may be able to recognize the configuration of the PUCCH (or R-PUCCH) format for the transmission in advance. Meanwhile, as a guard time is introduced into a relay node backhaul UL, in order to put a limitation on a use of a specific modified PUCCH (or R-PUCCH) format, a transmission allocation of a relay node backhaul UL subframe may be configured to match correspondingly.

Consideration of Relay Node Backhaul UL Transmission Subframe Configuration

In the following description, when a relay node transmits a scheduling request to a base station, a method of considering a configuration status of a relay node backhaul UL transmission subframe is explained.

Basically, a UL subframe enabling a random relay node to transmit a prescribed scheduling request may be set among prescribed subframes configured for a relay node backhaul UL transmission. In this case, the relay node backhaul UL transmission is configured by a scheme of TDM with an access UL reception and a UL subframe allocated to the backhaul UL transmission is not set periodically. Hence, since it may be difficult to periodically set a configuration of a backhaul transmission subframe for sending a scheduling request, it may be difficult to put limitation on a fixed subframe to be allocated for a scheduling request with reference to one radio frame of 10 ms. In this case, considering that HARQ timing relation between a relay node backhaul DL and a relay node backhaul UL is designed based on a period of 8 ms, it may be able to allocate a subframe in a radio frame interval of 40 ms (i.e., the least common multiple of 10 ms and 8 ms) to a subframe resource for a scheduling request transmission and an RN-specific RRC parameter configuration for a channel resource allocation. In particular, in viewpoint of a subframe allocation for a scheduling request transmission, it may be able to apply an RRC parameter for the subframe allocation by 10 ms-radio frame unit and/or an RRC parameter for the subframe allocation within the 40 ms-radio frame interval uniquely or optionally.

Extension of Scheduling Request

According to the 2nd embodiment and 3rd to 7th embodiments explained later in the following description, if a scheduling request is explicitly transmitted in backhaul UL, a handshaking procedure including a UL grant PDCCH (or R-PDCCH) or PUCCH (or R-PUCCH) for a buffer status reporting of a relay node may be performed in continuation with the scheduling request transmission. Yet, this handshaking procedure may put a burden on the relay node due to the above-mentioned backhaul UL subframe allocation scheme.

To settle such a burden, it may be able to consider a scheme of using a scheduling request to replace a buffer status reporting process performed separately from the scheduling request or transmit state information in part. For this configuration, it may be able to newly define an extended scheduling request information having a size of a plurality of bits instead of a conventional 1-bit scheduling request information.

For instance, after 2-bit scheduling request information has been configured, it may be able to report a buffer status using 3 of 4 states represented as 2 bits except a state of 'no scheduling request'. A scheduling request for an audio transmission, a scheduling request for a data transmission or the like may become one example of the buffer status.

Alternatively, other information may be included in an extended scheduling request instead of the buffer status information. For instance, such information as backhaul carrier aggregation related measurement information, channel measurement information of another frequency band failing to covered with SRS within an allocated carrier, CFI setting value in access link, the number of relay-UEs in a relay node area, a relay node area size and the like may be transmitted in a manner of being included in a scheduling request having an extended bit size.

Alternatively, an extended scheduling request or a conventional 1-bit scheduling request may be transmitted by being tied with other information. Information transmittable together with a scheduling request may include ACK/NACK or CSI (channel status information). Meanwhile, for a transmission of the conventional 1-bit scheduling request or the aforesaid extended scheduling request, PUCCH format 1a/1b series, PUCCH format 2/2a/2b series, a newly defined PUCCH (or R-PUCCH) format described later, or a dedicated physical channel may be used instead of PUCCH format 1 based on non-coherent detection.

The PUCCH resource setting for the channel transmission may be set to be transmitted on a resource configured for a scheduling request using a conventional RRC signaling, an implicit ACK/NACK setting resource, an RRC configured ACK/NACK resource or an RRC configured CSI transmission resource. Details shall be explained later in this specification.

3rd Embodiment

3rd embodiment of the present invention relates to a method of defining a new R-PUCCH format for a scheduling request information transmission.

By succeeding the aforesaid methods of the upper layer configuration for the determination of the basic PUCCH channel structure, the transmission timing and the transmission scheme according to the 1st embodiment of the present invention, control information for modifying a conventional 1-bit scheduling request in viewpoint of a relay node backhaul UL transmission may be applicable to a transmission of a scheduling request.

In particular, according to a UL scheduling initiating scheme using a conventional 1-bit scheduling request, a handshaking of control information between a cell base station and a relay node may be requested several times. This may cause considerable latency in accordance with a situation of a relay node backhaul UL subframe configuration.

To solve the above problem of a conventional scheduling request configuration, it may apply the scheme explained in the description of the extended scheduling request of the 2nd embodiment. In particular, by extending a bit-width of a scheduling request message to B (B>1), it may be able to transmit a detailed control information of a buffer status information of a corresponding relay node and the like. In the following description, a new PUCCH (or R-PUCCH) channel configuration scheme may be explained to implement a transmission of such an extended scheduling request.

(1) By intactly applying PUCCH format 1 used for a conventional scheduling request, it may be able to transmit an increased control information in a manner of extending a symbol space. In order to extend a symbol space, a modulation scheme of a higher order [e.g., n-PSK (phase shift keying) scheme, n-QAM (quadrature amplitude modulation) scheme, etc.] may be used or slot-based information multiplexing (i.e., method of multiplexing and transmitting control information different per slot) may be taken into consideration. Accordingly, a newly defined PUCCH (or R-PUCCH) format belongs to PUCCH format 1 series and may be defined as PUCCH format 1c, PUCCH format 1d or the like.

(2) In order to support an extended bit-width of a scheduling request, it may be able to consider a method of using a conventional PUCCH format 2. In particular, a relay node receives allocation of a transport channel resource through RRC signaling and then transmits control informations, which are included in the aforesaid extended scheduling request in the allocated transport channel resource, according to PUCCH format 2. A cell base station is configured to decode the corresponding control information according to the PUCCH format 2.

(3) In order to support an extended bit-width of a scheduling request, it may be able to define a new PUCCH (or R-PUCCH) format X, where X is an index equal to or greater than 3. The newly defined PUCCH format X follows a new PUCCH (or R-PUCCH) channel design different from the conventional PUCCH format 1 series or the conventional PUCCH format 2 series. According to this scheme, a relay node may be able to receive allocation of a transport channel resource through RRC signaling. For instance, a relay node may be able to receive allocation of a frequency resource (e.g., prescribed PRB) discriminated from a conventional channel for a transmission of a scheduling request. A relay node may be configured to transmit control informations included in the aforesaid extended scheduling request according to a newly defined PUCCH format X on an allocated transport channel resource and a cell base station may be configured to decode the corresponding control information according to the corresponding PUCCH format X.

(4) Without designating PUCCH (or R-PUCCH) format for a transmission of a scheduling request separately, it may be able to consider a method for a cell base station to explicitly recognize a data to be transmitted in UL from a periodic transmission of a buffer status reporting of a relay node. Moreover, it may be able to consider a method for having a scheduling request bit included explicitly in control informations contained in a buffer status reporting of a relay node.

4th Embodiment

4th embodiment of the present invention relates to a method of defining RN-specific RRC parameter for an adaptive application between the 1st embodiment and the 2nd embodiment or between the 1st embodiment and the 3rd embodiment.

The 1st embodiment relates to a method of not defining a scheduling request, the 2nd embodiment relates to a method of reusing a conventional PUCCH format, and the 3rd embodiments relates to a method of defining a new PUCCH (or R-PUCCH) format. The efficient application of the 1st embodiment and the 2nd (or 3rd) embodiment may differ in accordance with a situation of a relay node. For instance, in consideration of a distributed situation of relay-UE in a relay node area and a relay node backhaul traffic situation, efficiency of a UL resource allocation scheduling scheme may differ. Hence, it may be necessary to adaptively apply the 1st embodiment and the 2nd (or 3rd) embodiment in accordance with a situation.

Accordingly, RN-specific RRC parameter may be designated for the adaptive application of the 1st embodiment and the 2nd (or 3rd) embodiment, whereby a scheduling request operation of a relay node and/or a backhaul UL scheduling scheme of a cell base station may be selectively configured. To support this configuration, the relay node may be able to transmit relevant information and parameters for the adaptive application of a scheduling request method to the cell base station via a periodic buffer status reporting.

5th Embodiment

5th embodiment of the present invention relates to a method of performing a scheduling request on a dedicated physical random access channel (PRACH).

The 1st to 4th embodiments mentioned in the foregoing description relate to a method of transmitting a scheduling request from a relay node to a backhaul UL set cell base station implicitly/explicitly using a prescribed L1/L2 dedicated PUCCH (or R-PUCCH) or based on RN-specific (or UE-specific) RRC signaling or methods for excluding a transmission of such control information. The 5th embodiment of the present invention proposes a method of transmitting a scheduling request message including 1 bit or B bits (B>1) using a channel different from PUCCH format 1. For instance, PRACH may be usable as the different channel.

According to the 5th embodiment of the present invention, by transmitting PRACH preamble assigned as dedicated to a random relay node to a cell base station to match PRACH transmission period configuration, the cell base station may be enabled to allocate a backhaul UL transmission resource to the corresponding relay node. As the dedicated PRACH preamble is used, a contention resolution process may be unnecessary for a random access procedure. In this case, a dedicated PRACH preamble index may be permanently assigned to each relay node with reference to a PRACH preamble set allocated within a cell. Yet, if a PRACH preamble index is permanently assigned in a manner of being dedicated to each relay node in a cell, it may cause a problem in aspect of overall PRACH preamble capacity of cell base station. Hence, in a manner similar to that of a handover process, it may be able to use a method of assigning a dedicated PRACH preamble to a random relay node limitedly and then collecting the assigned preamble.

For instance, in case that a UL transmission is not performed by a random relay node for predetermined duration, a dedicated PRACH preamble index is assigned to the corresponding relay node. After the corresponding relay node transmits a UL scheduling request using the assigned dedicated PRACH preamble, the used dedicated PRACH preamble index may be cancelled. In this case, a random one of the formats defined in the conventional 3GPP LTE (Release-8 or Release 9) system may be used as a PRACH preamble format. A preamble format may be intactly applicable as defined previously. And, a preamble format of a type, in which a length of PRACH preamble is modified in accordance with a configuration of a guard time (GT) applied in at least one or more UL subframes, may be applicable.

6th Embodiment

6th embodiment of the present invention relates to a method of transmitting an extended scheduling request in a manner of modulating the extended scheduling request coherent to a scheduling request resource. The 6th embodiment of the present invention is associated with the method of transmitting the extended scheduling request (i.e., the B-bit scheduling request) explained in the description of the 2nd and 3rd embodiments.

A conventional scheduling request is transmitted as PUCCH format 1 using a scheduling request resource. Having received the scheduling request, a cell base station non-coherently detects that the scheduling request has been made. In this case, the coherent detection may mean that a channel is detected in a manner of being estimated, compensated, demodulated and decoded on the basis of a pilot (e.g., a reference signal) of the channel. And, the non-coherent detection may mean an energy based detection scheme without channel estimation with a pilot (e.g., a reference signal).

Meanwhile, if a transmission of an incremented number of bits is requested for an extended scheduling request, it may be able to consider a method of transmitting s-bit scheduling request information via S scheduling request resources (S>1) for a power-non-limited relay node.

Alternatively, if scheduling request information is modulated and transmitted via a scheduling request resource, it may be able to use PUCCH (or R-PUCCH) format that enables the scheduling request information to be coherently demodulated by a receiving stage (e.g., a base station). Using this PUCCH (or R-PUCCH) format, scheduling request information is transmitted or both scheduling request information and ACK/NACK information may be transmitted together. For instance, it may be able to use PUCCH format 1a, PUCCH format 1b or PUCCH format 2. Using the PUCCH format 1a, a 1-bit scheduling request may be transmitted or both a scheduling request and an ACK/NACK information may be transmitted together. Using the PUCCH format 1b, a 2-bit scheduling request may be transmitted or both a scheduling request and an ACK/NACK information may be transmitted together. Using the PUCCH format 2, a T-bit (T≥1) scheduling request may be transmitted or both a scheduling request and an ACK/NACK information may be transmitted together. Meanwhile, it may be able to use PUCCH (or R-PUCCH) format that is newly designed for a random purpose.

7th Embodiment

7th embodiment of the present invention relates to a method of transmitting a scheduling request of a synch-RACH format.

According to the 5th embodiment mentioned in the foregoing description, a relay node uses a dedicated PRACH preamble index assigned by a base station. Yet, according to the 7th embodiment of the present invention, a relay node is able to transmit a PRACH preamble randomly selected from a PRACH preamble set allocated by a cell to which the relay node belongs. Following the PRACH preamble transmission (message 1), if a relay node performs a contention resolution process through a handshaking of a reception (message 2) of a response to a preamble, a transmission (message 3) of data including its identifier via UL grant PDCCH (or R-PDCCH) included in the preamble response and a PDCCH reception (message 4) through its identifier, the corresponding relay node is able to inform a cell base station of the necessity of a scheduling request.

Relay Node Downlink Channel Measurement Information

If a backhaul DL scheduling scheme for a relay node is semi-static or permanently persistent, assuming that a location of the relay node is fixed, it may be able to obtain a long-term channel feedback. Meanwhile, even if a dynamic channel scheduling is applied to a backhaul DL, a relay node has mobility relatively lower than that of a user equipment in general. Hence it may be preferable that the relay node obtains a long-term channel feedback relative to a channel feedback of the user equipment. Accordingly, a frequency for a relay node to report channel measurement information for a backhaul DL to a base station may be set lower than that of a case of a general user equipment. Considering that a backhaul UL transmission subframe allocation is not free in viewpoint of a relay node, it may be necessary for a channel measurement information reporting frequency to be intentionally maintained low. Thus, the adjustment of the frequency of the channel information feedback of the relay node may be configured by an upper layer through an RRC signaling to the corresponding relay node for a cell base station.

This channel measurement information may correspond to the measurement to support a general scheduling on at least one DL component carrier (CC) currently set on a backhaul DL or may include channel measurement information for the carrier setting on a base station scheduler or RPM function for at least one DL component carrier not set for a backhaul DL transmission despite being configured by a base station. In this case, the component carrier is related to carrier aggregation and may be able to provide one large bandwidth by combining a plurality of component carriers together.

In case of considering a case that a further advanced channel measurement scheme for a backhaul DL is applied, when a UL channel is determined to feed back this measurement information, both a symbol space, which can be provided by the UL channel, and a size of overall channel measurement feedback information required for carrier aggregation should be taken into consideration.

Moreover, it may be necessary to consider a case that a guard time (GT) for supporting a transmission/reception function switching of a relay node in a relay node backhaul UL is applied to a fore part and/or a last part of a backhaul UL subframe. In this case, a transmission symbol part, to which a guard time is applied in a 1st slot and/or a 2nd slot of one subframe in a structure of PUCCH format 2 series is punctured and data (e.g., control information) may be transmitted using the rest of transmission symbols. If this modified PUCCH (or R-PUCCH) format structure is applied, an effective coding rate is raised higher rather than a size of channel feedback information. Therefore, channel reliability may be lowered.

In order to extend a symbol space for control information by reinforcing or maintaining channel reliability at a proper level, a new PUCCH (or R-PUCCH) format structure may be designed for channel feedback. For instance, in case that a relay node includes a plurality of antennas, a separate PUCCH resource is allocated to each of the antennas. Subsequently, control information of a larger size is joint-coded by maintaining an appropriate effective coding rate based on the extended physical resources, modulated and then mapped to a physical resource. Meanwhile, a relay node may be able to transmit channel feedback information of a large size in backhaul UL in a manner of multiplexing a plurality of PUCCHs (or R-PUCCHs) for channel feedback on a frequency resource or a slot and frequency resource (e.g., case of applying a PUCCH transmission scheme using a single slot only).

In order to prevent a situation of excluding prescribed transmission symbols in PUCCH format 2 series structure due to the above-mentioned application of the guard time in the backhaul UL, as mentioned in the foregoing description of the 2nd embodiment for the scheduling request, if backhaul UL transmission subframes contiguous to each other are configured (e.g., configured by a cell base station scheduler intentionally, configured by an upper layer configuration of backhaul UL subframe setting), it may be able to adjust a transmission timing to transmit PUCCH (or R-PUCCH) including relay node channel feedback control information via one subframe having a guard time exist at a portion of the corresponding subframe or subframes having no guard time exist therein.

Since a relay node backhaul DL link is characterized in that a channel quality is relatively less changeable in accordance time than that of a DL for macro-UE, the necessity to frequently send channel feedback information may be low. Hence, a control of a timing for transmitting channel feedback information in backhaul UL may be implemented by an event-triggered method (e.g., a method for a relay node to aperiodically transmit channel feedback information transmission PUCCH). Request bit related to the event-triggered method may be defined in DCI format of UL grant PDCCH (or R-PDCCH) of a cell base station for a relay node. Alternatively, channel feedback information may be transmitted in a manner of being piggybacked on PUSCH by the event-triggered method. In particular, if there exists channel feedback information to be transmitted, the channel feedback information and data are multiplexed and transmitted on PUSCH.

Meanwhile, considering that HARQ timing relation between a relay node backhaul DL and a relay node backhaul UL is designed on the basis of a period of 8 ms, channel feedback information of a relay node may be transmitted on PUCCH (or R-PUCCH) or PUSCH (or R-PUSCH) of a long term amounting to an integer (1 included) multiple of 40 ms. If HARQ timing relation between a relay node backhaul DL and a relay node backhaul UL is designed on the basis of a period of 10 ms, relay node backhaul DL channel information may be transmitted on PUCCH (or R-PUCCH) or PUSCH (or R-PUSCH) of a long term amounting to an integer (1 included) multiple of 10 ms.

Uplink ACK/NACK for Downlink Data Transmission

In case that ACK/NACK information is transmitted via a PUCCH format 1a/1b or a modified PUCCH (or R-PUCCH) format, a structure of PUCCH (or R-PUCCH) may be defined using one of the methods according to the 2nd, 3rd and 4th embodiments of the present invention relating to a channel structure for a scheduling request transmission.

8th Embodiment

8th embodiment of the present invention relates to a method of reusing PUCCH format 1a/1b for ACK/NACK information transmission and corresponds to the channel structure for the scheduling request transmission according to the 2nd embodiment mentioned in the foregoing description.

UL resource allocation for PUCCH format 1a/1b in relay node backhaul UL may be implicitly performed using such random information as CCE of R-PDCCH, other PDSCH resource allocation and the like. Alternatively, considering that R-PDCCH can be designed into a new format, the UL resource allocation may be configured through RN-specific (or UE-specific) RRC signaling from a cell base station. In a situation that a random one of the two resource allocation methods is applied, a physical resource block, which is a transmission frequency resource of PUCCH or R-PUCCH for ACK/NACK transmission of a relay node, may be separately set to be discriminated from PUCCH transmission physical resource blocks of macro-UEs. The discriminated settings for the PUCCH transmission physical resource blocks of the relay node and the macro-UEs may be indicated by UE-specific and/or RN-specific RRC signaling from a base station or implemented in a manner of being implicitly discriminated based on a base station scheduling operation for individual UE-specific RRC signaling, CCE of R-PDCCH or resource allocation of P-PDSCH.

Modification of PUCCH Format 1a/1b

A guard time (GT) for supporting a transmission/reception function of a relay node may be applied to a fore part and/or a last part of a relay node backhaul UL transmission subframe [cf. FIG. 14]. In this case, since a channel structure of a conventional PUCCH format 1a/1b is not applicable as it is, a modification of the channel structure of the PUCCH format 1a/1b is necessary.

For a 2nd slot of one subframe, a method of configuring a channel of a shortened format has been designed in consideration of SRS transmission. Considering that this method if usable cell-specifically, a separate channel configuration may not be necessary.

Meanwhile, when a position of SRS transmission symbol is defined differently in a 2nd slot of one subframe (e.g., 2nd last transmission symbol), if a guard time (GT) exists, the number of symbols usable for a data (control information) transmission becomes 2 [cf. FIG. 15 (a)]. Hence, it may be able to apply a cover sequence configured in a manner that 2 elements at prescribed position are punctured for an orthogonal cover (e.g., Walsh cover) having a length of 2 or an orthogonal cover having a length of 4.

For a 1st slot of one subframe, a shortened PUCCH format 1a/1b channel configuration of a new type is necessary in consideration that a guard time is applied to a fore part of the slot. In particular, although a cyclic shift for a reference signal (RS) and an orthogonal cover configuration method are applicable as it is, an orthogonal cover mapping for data (control information) may need to be modified. Considering that a 1st transmission symbol interval of a subframe is excluded from a transmission due to the application of a guard time, an orthogonal cover having a length of 3 may be applied to the subframe by starting with a 2nd transmission symbol of a 1st slot of the subframe. In this case, the orthogonal cover having the length of 3 may use a DFT based orthogonal cover or a prescribed quasi-orthogonal sequence (e.g., simplex code sequence) generated from puncturing a 1st element for an orthogonal cover having a length of 4.

This selective use of the format may be set by RN-specific (or UE-specific) RRC signaling or cell-specific RRC signaling. In the former case, it may be able to apply a cover in accordance with a simplex code sequence. In the latter case, it may be able to apply a DFT based orthogonal cover.

If SRS transmission symbol is defined at a random position in a 1st slot of one subframe (e.g., last transmission symbol of the 1st slot), the number of data (control information) transmission symbols of the 1st slot becomes 2 [cf. FIG. 15 (b)]. Hence, it may be able to apply a cover sequence configured in a manner of puncturing 2 elements at a prescribed position in an orthogonal cover having a length of 2 or an orthogonal cover having a length of 4.

The aforesaid application of a shortened PUCCH format modified for a 2nd slot of one subframe and the application of a shortened PUCCH format for a 1st slot of one subframe may be synchronized together by RRC signaling (cell-specific or RN-specific). Moreover, it may be able to consider an additional modification of a channel configuration of PUCCH format 1a/1b according to the definition of the SRS transmission method. For this, an additional RRC parameter (cell-specific or RN-specific) relating to a presence or non-presence of format application per slot may be defined and used.

In case that a relay node backhaul UL subframe is set in at least 3 contiguous subframes, there may exist a relay node backhaul UL subframe in which a guard time (GT) is not set [cf. FIG. 16 (a)]. In this case, PUCCH (or R-PUCCH) format for ACK/NACK transmission may be able to use PUCCH format defined in the conventional 3GPP LTE (Release 8 or Release 9) as it is.

Meanwhile, it may happen that a guard time (GT) is applied to either a first part or a last part of a subframe [cf. FIG. 16 (b)]. In accordance with the allocation configuration of the relay node backhaul UL subframe, the SRS transmission setting configuration and the channel configuration of PUCCH (or R-PUCCH) formats for transmission of ACK/NACK information may be set by being interconnected to each other. For instance, it may be able to set SRS to be only transmitted in subframes, each of which has a guard time (TG) not set at a last transmission symbol part, among subframes allocated to a relay node backhaul UL using the time-invariant property of a relay node.

In consideration of the above-mentioned symbol configuration of the relay node backhaul UL subframe, the SRS transmission setting configuration and the channel configuration according to the PUCCH (or R-PUCCH) format and the scheduling request (RS) can be set in a manner of being interconnected to each other. For instance, it may be able to set SRS to be only transmitted in subframes (e.g., subframes 1610 and 1602 shown in FIG. 16 (a), subframe 1604 shown in FIG. 16 (b)), each of which has a guard time (TG) for a transmission/reception function switching not set at a last transmission symbol part, among subframes allocated to a relay node backhaul UL using the time-invariant property of a relay node.

The above setting may be implemented using RRC parameters that configure SRS transmission period, band, position and the like for a random relay node. This SRS transmission configuration may be set through UL subframe setting information that is implicitly set by relay node backhaul DL configuration information configured by an upper layer through a cell-specific or RN-specific RRC signaling. Alternatively, the above-mentioned SRS transmission configuration may be set in association with relay node backhaul UL configuration information configured by an upper layer through a cell-specific or RN-specific RRC signaling.

Meanwhile, in accordance with SRS transmission frame and timing configuration set by cell-specific and RN-specific RRC parameters set for a random relay node, the relay node backhaul DL or UL subframe configuration, which is configured by an upper layer, may be set in a manner of being matched in the SRS transmission subframe not to define a guard time (GT) in a relay node backhaul UL subframe.

Regarding PUCCH formats including ACK/NACK information, PUCCH (or R-PUCCH) formats of modified types may be usable in accordance with configurations of guard times (GT) within subframes set for relay node backhaul UL transmissions. In this case, a relay node and a cell base station may be able to recognize the configuration of the PUCCH (or R-PUCCH) format for the transmission in advance. Meanwhile, as a guard time is introduced into a relay node backhaul UL, in order to put a limitation on a use of a specific modified PUCCH (or R-PUCCH) format, a transmission allocation of a relay node backhaul UL subframe may be configured to match correspondingly.

Consideration of Relay Node Backhaul UL Transmission Subframe Configuration

In the following description, when a relay node transmits ACK/NACK information to a base station, a method of considering a configuration status of a relay node backhaul UL transmission subframe is explained.

Basically, a UL subframe enabling a random relay node to transmit a prescribed ACK/NACK information may be set among prescribed subframes configured for a relay node backhaul UL transmission. Accordingly, if HARQ timing relation between UL and DL is set to 8 ms, it may be difficult to periodically set a subframe capable of carrying a prescribed ACK/NACK information. And, it may be difficult to limit the subframe to a fixed subframe with reference to 10 ms-radio frame.

Therefore, it may be able to consider a subframe allocation within 40 ms-radio frame interval to RN-specific RRC parameter configuration for subframe and channel resource allocation for a scheduling request transmission. In particular, in aspect of subframe allocation for ACK/NACK information transmission, RRC parameter for subframe allocation by 10 ms-0 radio frame unit and/or RRC parameter for subframe allocation within 40 ms-radio frame interval may be applicable uniquely or selectively. Meanwhile, if HARQ timing relation between UL and DL is set to 10 ms, a subframe capable of carrying prescribed ACK/NACK information may be limited to a fixed subframe within one radio frame. Regarding the RN-specific RRC parameter configuration for this subframe configuration, RRC parameter for subframe allocation by 10 ms-radio frame unit may be applicable uniquely or selectively.

9th Embodiment

9th embodiment of the present invention relates to a method of defining a new R-PUCCH format for ACK/NACK information transmission and corresponds to the aforesaid channel structure for the scheduling request transmission according to the 3rd embodiment.

By succeeding the aforesaid methods of the upper layer configuration for the determination of the PUCCH channel structure, the transmission timing and the transmission scheme according to the 1st embodiment of the present invention, control information for modifying a conventional 1- or 2-bit ACK/NACK information in viewpoint of a relay node backhaul UL transmission may be applicable.

In particular, a size of ACK/NACK information may need to be increased due to carrier aggregation applied to a backhaul DL. Hence, it may be able to consider PUCCH configuration in which a bit-width (e.g., configured with B bits (B>2)) of ACK/NACK message is extended.

(1) By intactly applying PUCCH format 1a/1b used for a conventional 1- or 2-bit ACK/NACK transmission, it may be able to transmit an increased control information in a manner of extending a symbol space. In order to extend a symbol space, a modulation scheme of a higher order [e.g., n-PSK (phase shift keying) scheme, n-QAM (quadrature amplitude modulation) scheme, etc.] may be used or slot-based information multiplexing (i.e., method of multiplexing and transmitting control information different per slot) may be taken into consideration. Accordingly, a newly defined PUCCH (or R-PUCCH) format belongs to PUCCH format 1 series and may be defined as PUCCH format 1c, PUCCH format 1d or the like.

(2) In order to support an extended bit-width of ACK/NACK information, it may be able to consider a method of using a conventional PUCCH format 2. In particular, a relay node receives allocation of a transport channel resource through RRC signaling and then transmits extended ACK/NACK information via the allocated transport channel resource according to PUCCH format 2. A cell base station is configured to decode the corresponding control information according to the PUCCH format 2.

(3) In order to support an extended bit-width of ACK/NACK information, it may be able to define a new PUCCH (or R-PUCCH) format X, where X is an index equal to or greater than 3. The newly defined PUCCH format X follows a new PUCCH (or R-PUCCH) channel design different from the conventional PUCCH format 1 series or the conventional PUCCH format 2 series. According to this scheme, a relay node may be able to receive allocation of a transport channel resource through RRC signaling. For instance, a relay node may be able to receive allocation of a frequency resource (e.g., prescribed PRB) discriminated from a conventional channel for a transmission of ACK/NACK information. A relay node may be configured to transmit extended ACK/NACK information according to a newly defined PUCCH format X on the allocated transport channel resource and a cell base station may be configured to decode the corresponding control information according to the corresponding PUCCH format X.

Figure 17:
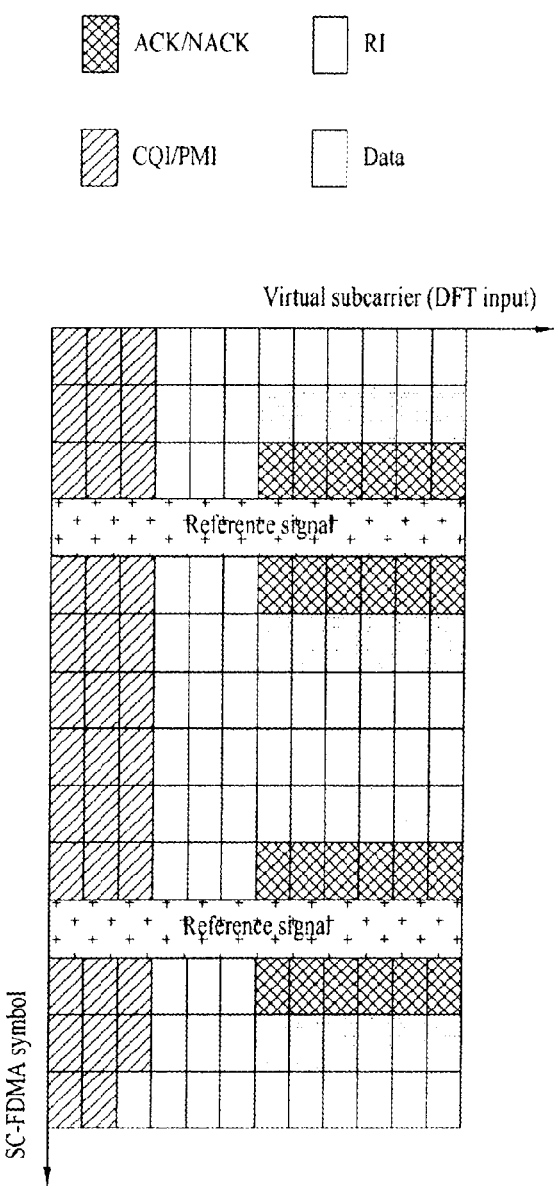
FIG. 17 is a diagram for a structure of mapping control information to PUSCH resource.

(4) Without designating PUCCH (or R-PUCCH) format for a transmission of ACK/NACK information separately, it may be able to transmit ACK/NACK information using PUSCH (or R-PUSCH) by a periodic or event-triggered method. FIG. 17 is a diagram for a structure of mapping ACK/NACK. CQI/PMI, RI and data to a resource on PUSCH in the conventional 3GPP LTE (Release 8 or Release 9) system. According to the present invention, in order to map extended ACK/NACK information to a resource on PUSCH (or ACK/NACK multiplexing), it may be able to use a method of mapping ACK/NACK to a resource on PUSCH in the same manner of the definition in the conventional 3GPP LTE system. Alternatively, it may be able to map extended ACK/NACK information to a resource on PUSCH using a method of transmitting CQI/PMI information on PUSCH defined in the conventional 3GPP LTE system. In this case, the extended ACK/NACK information may be transmitted in a manner of being mapped to PUSCH (or R-PUSCH) allocated resource of a subframe from a first part or a last part in order by a time-first mapping method.

When the extended ACK/NACK information is transmitted by being mapped to PUSCH (or R-PUSCH) resource by the method described with reference to FIG. 17, it may be necessary to consider a case that a switching interval (or a guard time (GT)) is applied to a backhaul UL subframe transmitted by a relay node. In the switching interval applied backhaul UL subframe, the extended ACK/NACK information may be mapped to the rest of physical resources except the physical resource of a transmission symbol to which the switching interval is applied.

10th Embodiment

10th embodiment of the present invention relates to a method of defining RN-specific RRC parameter for adaptive application between the eth and 9th embodiments for the ACK/NACK information transmission and corresponds to the aforesaid 4th embodiment relating to the channel structure for the scheduling request transmission.

Efficiency of the 8th or 9th embodiment may vary in accordance with a situation of a relay node. Hence, it may be able to designate RN-specific RRC parameter to adaptively apply the 8th or 9th embodiment in accordance with a corresponding situation. And, it may be able to correspondingly configure an ACK/NACK information transmitting operation of a relay node an/or a backhaul UL scheduling scheme of a cell base station selectively.

As mentioned in the foregoing descriptions of the 2nd and 3rd embodiments, if a size of ACK/NACK information becomes greater than 2 bits due to the application of carrier aggregation in relay node backhaul DL, it may be able to transmit extended ACK/NACK information by applying PUCCH format different from PUCCH format 1a/1b used for the ACK/NACK information transmission. In case that a relay node includes a plurality of antennas, a separate PUCCH (or R-PUCCH) resource is allocated to each of the antennas and the whole ACK/NACK information may be transmitted in a manner of configuring PUCCH (or R-PUCCH) individually by dividing the whole PUCCH (or R-PUCCH) by a unit of individual antenna unit based on the extended physical resources. A power-non-limited relay node may be able to transmit a plurality of PUCCHs (or R-PUCCHs) simultaneously by using the structure of PUCCH format 1a/1b intact. In case that ACK/NACK information is transmitted by being mapped to a resource on PUSCH, it may be able to apply a prescribed block coding scheme, a convolutional tail-biting coding scheme or the like to provide an effective coding rate enough for a size of extended ACK/NACK information, which is different from a method of transmitting ACK/NACK information by mapping it to symbols adjacent to a demodulated reference signal (DM RS) only if there is PUCCH (or R-PUCCH), as defined in the conventional 3GPP LTE (Release 8 or Release 9) system.

In the following description, items taken into consideration in common to the above-mentioned embodiments of the present invention are explained.

According to the present invention, in case that PUCCH for specific control information (e.g., scheduling request, relay node channel feedback information, etc.), in which a transmission timing and a transmission resource are configured by a prescribed upper layer (RRC) signaling, is configured, it may be able to set PUCCH (or R-PUCCH) transmission subframe synthetically in consideration of a backhaul UL transmission subframe allocation pattern (configured by an upper layer (RRC) as well). In this case, since the allocation of a backhaul UL transmission subframe is configured in accordance with HARQ timing, a transmission period of control information transmitted on PUCCH (or R-PUCCH) may be defined as HARQ timing or a multiple of the HARQ timing. For instance, in case that relay node backhaul DL and/or UL HARQ timing relation is set on the basis of 8 ms, a transmission period of control information transmitted via PUCCH (or R-PUCCH) may be defined as an integer (e.g., 1 included) multiple of 40 ms. For another instance, in case that relay node backhaul DL and/or UL HARQ timing relation is set on the basis of 10 ms, a transmission period of control information transmitted via PUCCH (or R-PUCCH) may be defined as an integer (e.g., 1 included) multiple of 10 ms.

Meanwhile, it may be able to modify a transmission structure of a symbol unit of PUCCH in accordance with a guard time (GT) set for a relay node backhaul UL transmission subframe. In order to minimize such modification, a following method may be applicable. Referring to FIG. 16 (c), when at least one relay node backhaul UL transmission subframe allocation is contiguously performed [e.g., 2nd and 3rd subframes shown in FIG. 16 (c)], a slot, for which a guard time (GT) is not set, is a 2nd slot 1606 of a former subframe or a 1st slot 1607 of a latter subframe. Thus, using the guard time (GT) unset slots 1606 and 1607, it may be able to transmit PUCCH for a scheduling request, a relay node backhaul DL channel feedback and ACK/NACK control information on DL transmission. In this case, PUCCH channel structure per slot may adopt a structure that does not consider a transmission symbol puncturing in accordance with a guard time. For instance, it may be able to apply PUCCH format 1 defined by the conventional 3GPP LTE (Release 8 or Release 9) for a scheduling request. In may be able to apply PUCCH format 1a/1b for ACK/NACK transmission for DL transmission. And, it may be able to apply PUCCH format 2/2a/2b for a DL channel feedback.

Meanwhile, in case of transmitting relay node backhaul UL control information using a resource of PUSCH, it may be able to consider a case that at least one or more backhaul UL transmission subframes are contiguously allocated. In this case, a subframe to carry a corresponding PUSCH may be uniquely set in accordance with a physical resource mapping method of control information transmission symbol within the PUSCH.

For instance, referring to FIG. 17, ACK/NACK information may be mapped in a manner of puncturing data transmission symbols adjacent to demodulated reference signal (DM-RS) transmission symbol (e.g., 4th symbol position in each slot). Rank indicator (RI) information may be mapped to transmission symbols adjacent to ACK/NACK transmission symbol in a slot boundary direction. The RI information may be defined as control information for determining a size of whole feedback information in case of a channel feedback in 3GPP LTE-A system. When PUSCH is configured by the above-mentioned mapping method, assume a case that 2 relay node backhaul UL subframes are contiguously allocated [e.g., subframes 1604 and 1605 shown in FIG. 16 (b)]. In this case, it may be able to transmit PUSCH having control informations mapped thereto using a subframe having a guard time (GT) not set at its fore part (e.g., subframe 1605 shown in FIG. 16 (b)). This may consider a fact that channel feedback information is mapped by starting with a 1st transmission symbol of a slot in case of an extended CP.

A guard time (GT) set at a last transmission symbol part of a subframe may collide with SRS transmission symbol position defined in the conventional 3GPP LTE (Release 8 or Release 9) system. In consideration of the collision, if 2 relay node backhaul UL subframes are contiguously allocated [e.g., subframes 1604 and 1605 shown in FIG. 16 (b)], it may be able to transmit PUSCH having control informations mapped thereto using a subframe having a guard time (GT) not set at its last symbol part (e.g., subframe 1604 shown in FIG. 16 (b)).

As mentioned in the foregoing description of the embodiments, if a PUCCH channel structure, in which PUCCH formats (PUCCH format 1/1a/1b/2/2a/2b) defined by the conventional 3GPP LTE system) are modified in consideration of a guard time (GT) on a relay node backhaul UL subframe and a physical signal (e.g., SRS, etc.), is applied, it may be able to apply the modified PUCCH channel structure to a separate physical resource block (PRB) discriminated from a resource for PUCCH defined in the conventional 3GPP LTE system.

Meanwhile, if it is difficult to design R-PUCCH due to a presence of a guard time (GT) in a relay node backhaul UL and the like or channel information to be transmitted requires a code resource space larger than a symbol space provided by PUCCH, the R-PUCCH may not be defined in a backhaul UL. Instead, relay node backhaul feedback informations of all types may be fed back to a base station via PUSCH. In doing so, control information may be transmitted on PUSCH only or various kinds of control informations and data are transmitted on PUSCH by being multiplexed together. Thus, in a method of transmitting control information on PUSCH, it may be able to use aperiodic PUSCH (or R-PUSCH) of the conventional 3GPP LTE (Release 8 or Release 9) system or PUSCH (or R-PUSCH) of a type periodically configured by an upper layer. Moreover, the present invention is non-limited by the above-mentioned exemplary description and may apply to new multiplexing schemes for feedback informations requested by a relay node backhaul UL of a new type.

Figure 18:
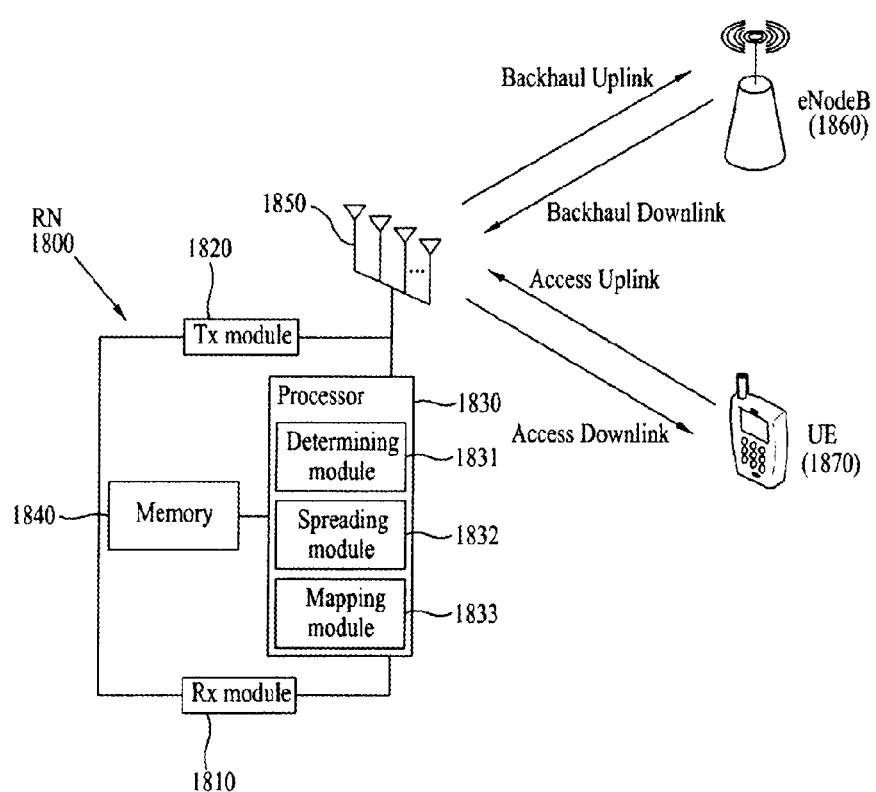
FIG. 18 is a diagram of a wireless communication system including a relay node, a base station device and a user equipment device according to one preferred embodiment of the present invention.

FIG. 18 is a diagram of a wireless communication system including a relay node 1800, a base station device 1860 and a user equipment device 1870 according to one preferred embodiment of the present invention.

A base station needs to be equipped with a DL transmission function and a UL reception function only and a user equipment needs to be equipped with a DL reception function and a UL transmission function only. Yet, a relay node needs to perform a function of a backhaul DL reception from the base station, a function of a backhaul UL transmission to the base station, a function of an access UL reception from the user equipment and a function of an access DL transmission to the user equipment all. Therefore, the relay node may be able to include a receiving module 1810 and a transmitting module 1820. The receiving module 1810 may include a 1st receiving module configured to receive a backhaul DL from the base station and a 2nd receiving module configured to receive an access UL from the user equipment. The transmitting module 1820 may include a 1st transmitting module configured to transmit a backhaul UL to the base station and a 2nd transmitting module configured to transmit an access DL to the user equipment. And, the relay node may be able to include a processor 1830. The processor 1830 is connected with the receiving module 1810 and the transmitting module 1820 to control the receiving module 1810 and the transmitting module 1820. And, the processor 1830 is connected with the rest of the components including a memory 1840 and the like of the relay node and may be able to control overall operations of the relay node including the components. An antenna 1850 of the relay node may include a single antenna or a plurality of antennas. If the relay node includes a plurality of the antennas, it may be provided to support MIMO system.

The relay node according to one embodiment of the present invention may be able to transmit backhaul UL control information to the base station. In this case, the backhaul UL control information may include at least one of a scheduling request, backhaul DL channel measurement information and ACK/NACK for a DL data transmission.

For the transmission of the backhaul UL control information, the processor 1830 may include a determining module 1831, a spreading module 1832 and a mapping module 1833. The determining module 1831 is able to determine whether a guard time (GT) is set for one time slot of a backhaul UL subframe transmitted via the 1st transmitting module. Hence, a guard time set slot including a transmission symbol may be determined as a 1st type slot or a slot failing to have a guard time set may be determined as a 2nd type slot. In accordance with a determination result by the determining module 1831, a different sequence may be applied to a spreading of backhaul UL control information. In particular, the spreading module 1832 may be able to spread the backhaul UL control information in time domain using a sequence (e.g., an orthogonal sequence having a length of 3) having a 1st length for the 1st type slot having the guard time (GT) set therefor. And, the spreading module 1832 may be able to spread the backhaul UL control information using a sequence (e.g., an orthogonal sequence having a length of 4) having a 2nd length for the 2nd type slot having the guard time (GT) not set therefor. The mapping module 1833 may be able to map the backhaul UL control information spread by the spreading module 1832 to a transmission symbol of a prescribed slot. And, the processor 1830 may be able to control a backhaul UL subframe, which includes at least one of the backhaul UL control information mapped 1st type slot and the backhaul UL control information mapped 2nd type slot, to be transmitted to the base station.

For instance, in case of a normal CP, one slot includes 7 transmission symbols and 3 contiguous symbols in the middle of the 7 transmission symbols are used for a reference signal (RS) transmission. Hence, backhaul UL control information may be basically spread and mapped to the remaining 4 transmission symbols using a sequence having a length of 4. In case that a guard time is set for one slot, a modified spreading and mapping operation may be performed. In particular, the processor 1830 may be able to generate a sequence having a 1st length (e.g., an orthogonal sequence having a length of 3) by puncturing sequence element(s) (e.g., one sequence element) corresponding to the number of the guard time set transmission symbols in a sequence having a 2nd length (e.g., an orthogonal sequence having a length of 4).

It may be able to consider a case that a symbol for a sounding reference signal (SRS) transmission is additionally included in one slot. In this case, a shortened PUCCH format 1 may be usable for a slot having no guard time set therefor (e.g., 2nd type slot). Yet, in a guard time set slot (e.g., 2nd type slot), spreading and mapping of the backhaul UL control information may be performed using a modified sequence in addition. In particular, the determining module may be further configured to determine whether one time slot in a backhaul UL subframe includes a sounding reference signal (SRS) transmission symbol. Hence, if the time slot includes the sounding reference signal transmission symbol, the processor 1830 may be able to further puncture sequence element(s) (e.g., one sequence element) corresponding to the number of sounding reference signal transmission symbols in a sequence of a 1st length (e.g., a sequence having a length of 3) and a sequence of a 2nd length (e.g., a sequence having a length of 4). Accordingly, if a symbol for a sounding reference signal is transmitted in one guard time set slot, a sequence having a length of 2 may be used. If a symbol for a sounding reference signal is transmitted in one slot having no guard time set therefor, a sequence having a length of 3 may be used.

In case that a bit-width is increased to send additional control information in accordance with extension of backhaul UL control information, it may be able to consider a case that a conventional PUCCH configuration is unable to carry the increased control information. In this case, the processor 1830 may be able to support the increased bit-width by modulating the backhaul UL control information using one of a phase and an amplitude or by multiplexing the backhaul UL control information on the basis of a slot.

In order to determine a timing of transmitting backhaul UL control information, the processor 1830 may be able to control the backhaul UL control information to be transmitted by a transmission period based on HARQ (hybrid automatic repeat request) timing of backhaul UL and backhaul DL. In particular, the processor 1830 may be able to allocate a subframe for transmitting the backhaul UL control information by a radio frame unit amounting to an integer (1 included) multiple of 10 ms or 40 ms via RRC parameter from the base station.

The processor 1830 performs a function of operating information received from the base station and/or the user equipment, information to transmit to the base station and/or the user equipment and the like. The memory 1840 may be able to store the operated information and the like for prescribed duration and may be substituted with such a component as a buffer (not shown in the drawing) and the like.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

A method and apparatus for transmitting control information in a relay node backhaul uplink according to various embodiments of the present invention may be available for a mobile communication system including a relay node or wireless communication industry.

What is claimed is:

1. A method for receiving acknowledgement information at a base station, the method comprising:
   transmitting, by the base station to a relay node, a downlink data; and
   receiving, by the base station from the relay node, the acknowledgement information in response to the downlink data, using resources for transmission of the acknowledgement information,
   wherein the downlink data is transmitted on a physical downlink shared channel (PDSCH) in a subframe indicated by a subframe configuration pattern configured for a transmission from the base station to the relay node which is provided by a higher layer signaling from the base station, and the subframe configuration pattern includes information about a subframe in which the downlink data is transmitted from the base station to the relay node, and
   wherein the acknowledgement information is transmitted from the relay node to the base station in a specific subframe that is determined based on information provided in the subframe configuration pattern.

2. The method of claim 1, wherein a resource for transmission of the acknowledgement information on a first antenna and a resource for transmission of the acknowledgement information on a second antenna are configured respectively, if the relay node is configured with two antennas.

3. The method of claim 1, wherein the acknowledgement information is received on a physical uplink control channel (PUCCH).

4. The method of claim 1, wherein the resource for transmission of the acknowledgement information is a PUCCH resource for transmission of the acknowledgement information.

5. The method of claim 4, wherein the PUCCH resource for transmission of the acknowledgement information are configured by higher layers.

6. The method of claim 5, wherein the higher layers include radio resource control (RRC) layer.

7. The method of claim 1, wherein the acknowledgement information is hybrid automatic repeat request (HARD) acknowledgement information.

8. The method of claim 1, wherein the PDSCH is indicated by a detection of relay-physical downlink control channel (R-PDCCH).

9. The method of claim 1, wherein the acknowledgment information is transmitted using PUCCH format 1a or 1b.

10. A base station for receiving acknowledgement information, the base station comprising:
   receiver;
   transmitter; and
   processor,
   wherein the processor is configured to control the transmitter to transmit, to a relay node, a downlink data, and control the receiver to receive, from the relay node, the acknowledgement information in response to the downlink data, using resources for transmission of the acknowledgement information,
   wherein the downlink data is transmitted on a physical downlink shared channel (PDSCH) in a subframe configuration pattern configured for a transmission from the base station to the relay node which is provided by a higher layer signaling from the base station, and the subframe configuration pattern includes information about a subframe in which the downlink data is transmitted from the base station to the relay node, and
   wherein the acknowledgement information is transmitted from the relay node to the base station in a specific subframe that is determined based on information provided in the subframe configuration pattern.

* * * * *